(12) United States Patent
Taing

(10) Patent No.: US 7,958,453 B1
(45) Date of Patent: Jun. 7, 2011

(54) SYSTEM AND METHOD FOR REAL-TIME, MULTI-USER, INTERACTIVE AND COLLABORATIVE ENVIRONMENTS ON THE WEB

(76) Inventor: Len Bou Taing, Alexandria, VA (US)

( * ) Notice: Subject to any disclaimer, the term of this patent is extended or adjusted under 35 U.S.C. 154(b) by 897 days.

(21) Appl. No.: 11/905,496

(22) Filed: Oct. 1, 2007

Related U.S. Application Data

(60) Provisional application No. 60/847,910, filed on Sep. 29, 2006.

(51) Int. Cl.
*G06F 3/00* (2006.01)
*G06F 3/048* (2006.01)
*G06F 15/16* (2006.01)

(52) U.S. Cl. ........ 715/744; 715/733; 715/751; 715/753; 715/758; 715/759; 709/204; 709/205

(58) Field of Classification Search .................. 715/744, 715/733, 751, 753, 755, 758, 759; 709/205
See application file for complete search history.

(56) References Cited

U.S. PATENT DOCUMENTS

| | | | |
|---|---|---|---|
| 5,008,853 A | 4/1991 | Bly | |
| 5,960,173 A | 9/1999 | Tang | |
| 6,219,045 B1 | 4/2001 | Leahy | |
| 6,240,444 B1 | 5/2001 | Fin | |
| 6,559,863 B1 * | 5/2003 | Megiddo | 715/753 |
| 6,954,902 B2 * | 10/2005 | Noma et al. | 715/753 |
| 6,958,981 B1 | 10/2005 | Hemminger | |
| 6,983,416 B1 * | 1/2006 | Bae et al. | 715/234 |
| 7,263,526 B1 | 8/2007 | Busey | |
| 7,346,654 B1 * | 3/2008 | Weiss | 715/753 |
| 7,450,003 B2 * | 11/2008 | Weber et al. | 340/539.2 |
| 2003/0001890 A1 * | 1/2003 | Brin | 345/753 |
| 2006/0026233 A1 * | 2/2006 | Tenembaum et al. | 709/205 |

OTHER PUBLICATIONS

Stefik, M., D.G. Bobrow, et al. "WYSIWIS Revised: Early Experiences With Multi-User Interfaces," ACM Transactions on Office Information Systems, (Apr. 1987). vol. 5(2), pp. 147-167.
"Quek Test" http://quek.nl/q/index.jsp?url=http://www.q42.nl.
"Quek Help" http://quek.nl/demos/quek/docs/uk/help.html.
"Lluna Virtual Presence Project" http://developer.lluna.de/.
"About 62" http://developer.lluna.de/about.html.
"Weblin" http://www.weblin.com/index.php?room=en3.
"Weblin" (2)http://www.weblin.com/index.php?cmd=B4DA282A0ICroom=en3.
"Weblin" (3) http://www.weblin.com/help.php?room=en3.

* cited by examiner

*Primary Examiner* — Weilun Lo
*Assistant Examiner* — Dino Kujundzic

(57) ABSTRACT

A method and system for real-time multi-user interactions and collaborations over the web. A method of balancing the needs of the group and the needs of the individual is shown through implementation of relaxed WYSIWIS design principles, where each web page served by the server system is comprised of two graphical layers: a web content layer and an interaction space. The web content layer contains the textual or graphical content or the web page that may be edited by a group of users in real-time. The interaction space is where users are given virtual embodiment through graphical representations known as avatars. It is a space where users can see other users and perform actions that will be seen by others in real-time. The interaction space is overlaid on top of the web content layer thereby creating one integrated space for multi-user interaction and collaboration.

20 Claims, 16 Drawing Sheets

Live Content Editing and Annotation

System Diagram
--Prior Art--

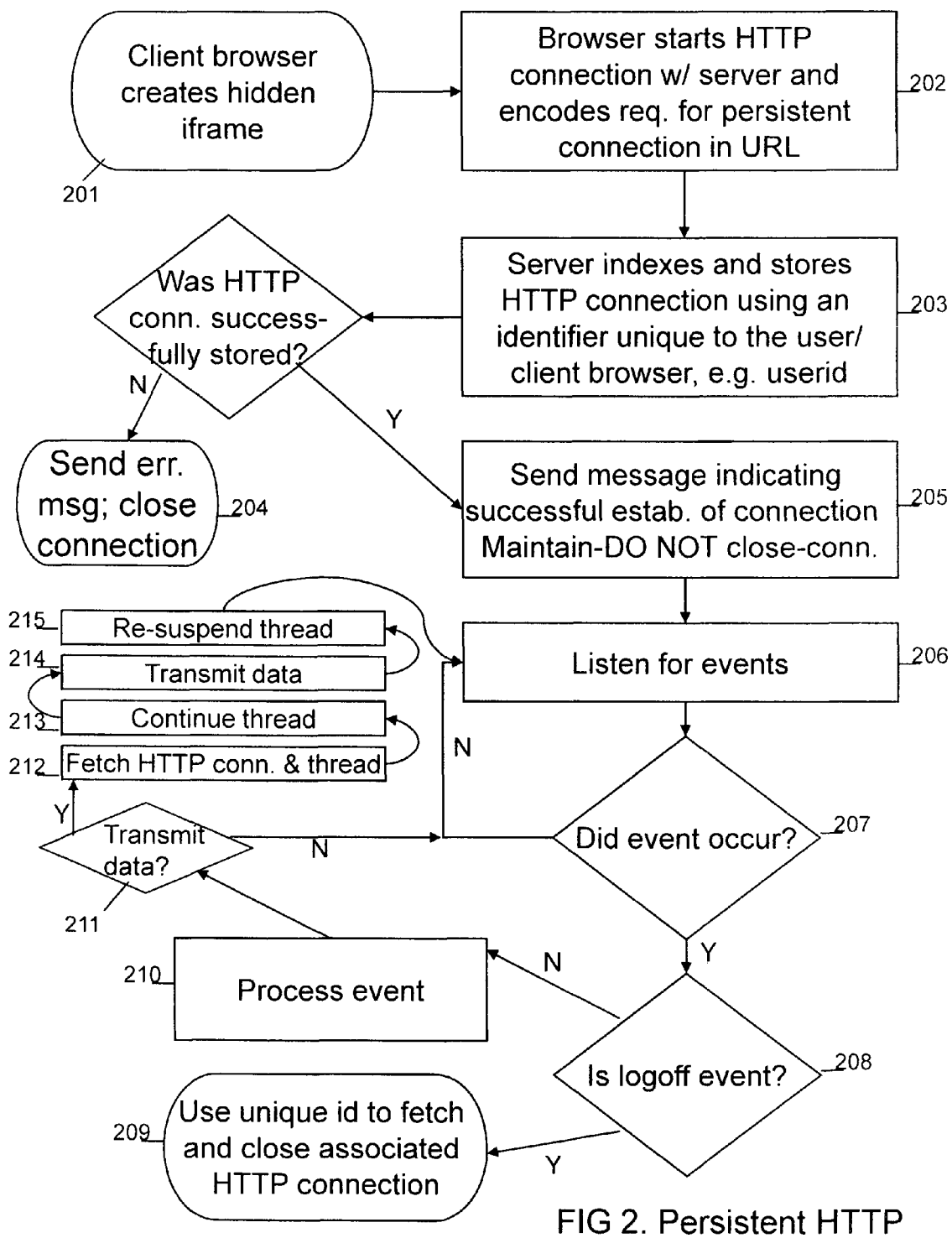
FIG 2. Persistent HTTP Connection Flowchart

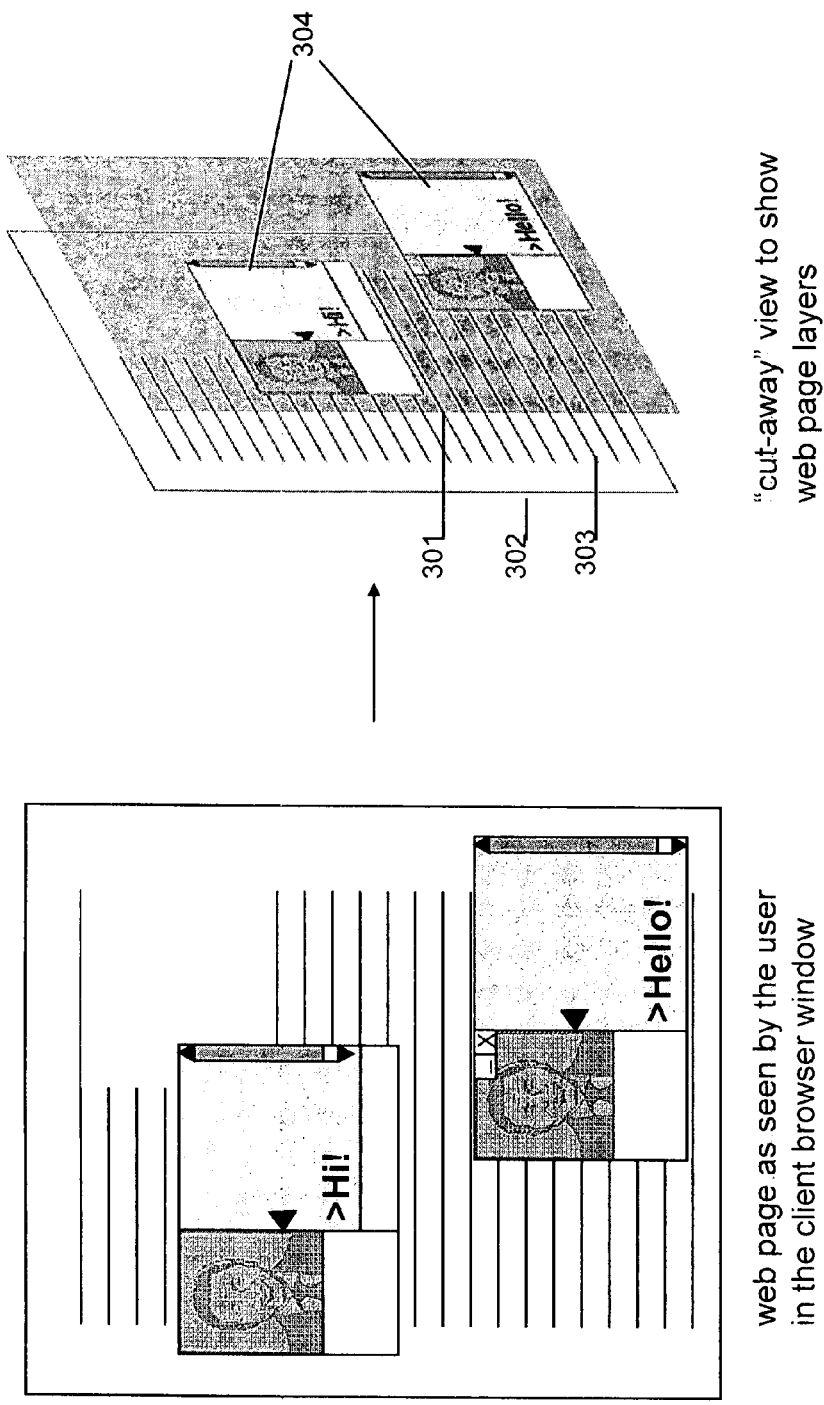
FIG. 3 User Interface Layers

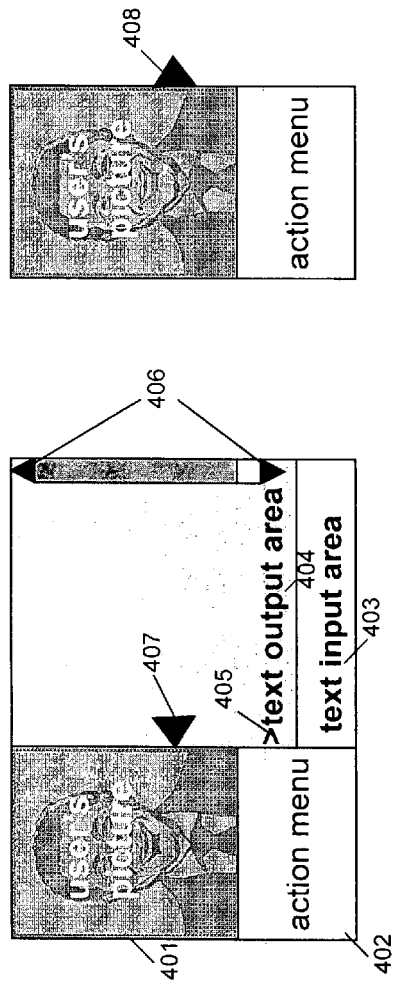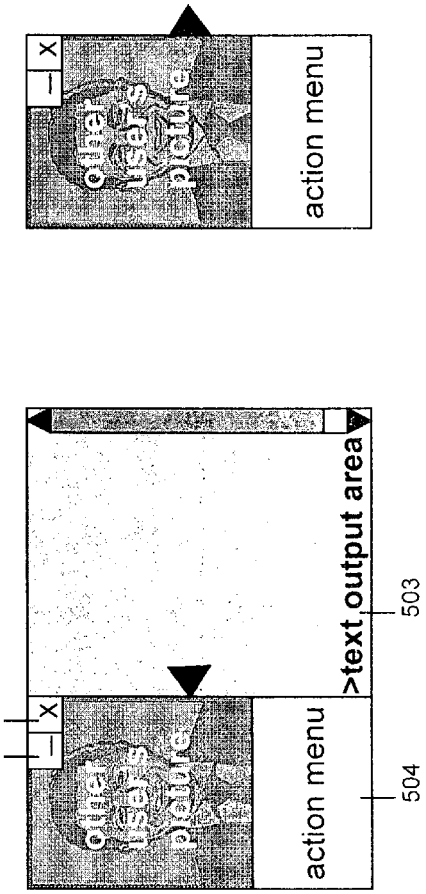
FIG. 4 The User's Avatar
FIG. 5 Other User's Avatar

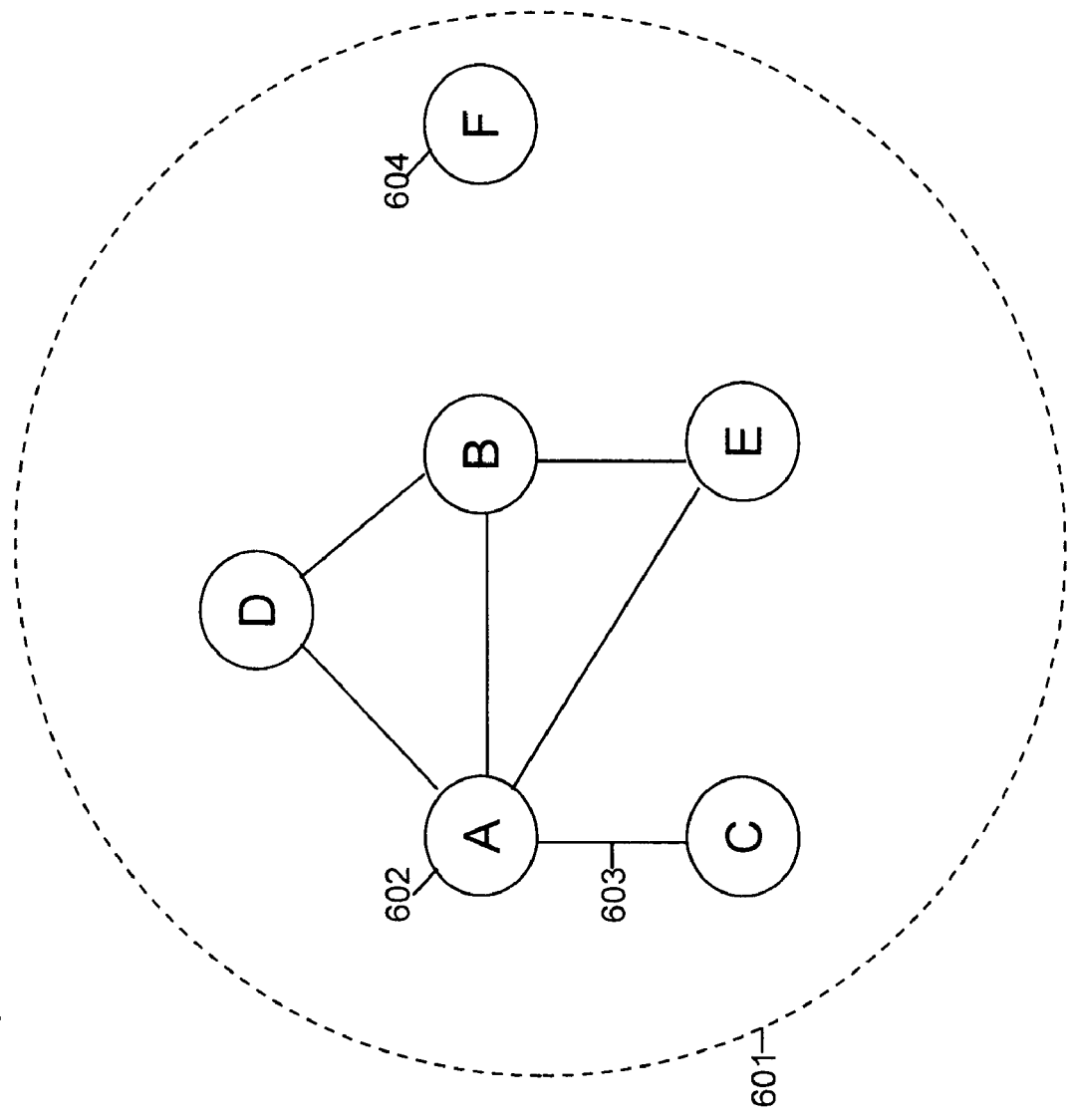
FIG. 6 Example Interaction Network Data Structure

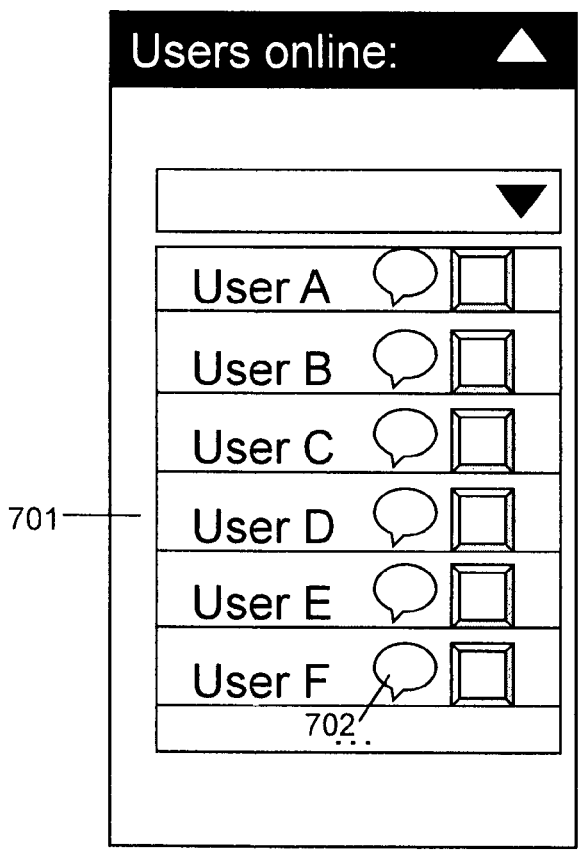
FIG. 7 Invitation Pane

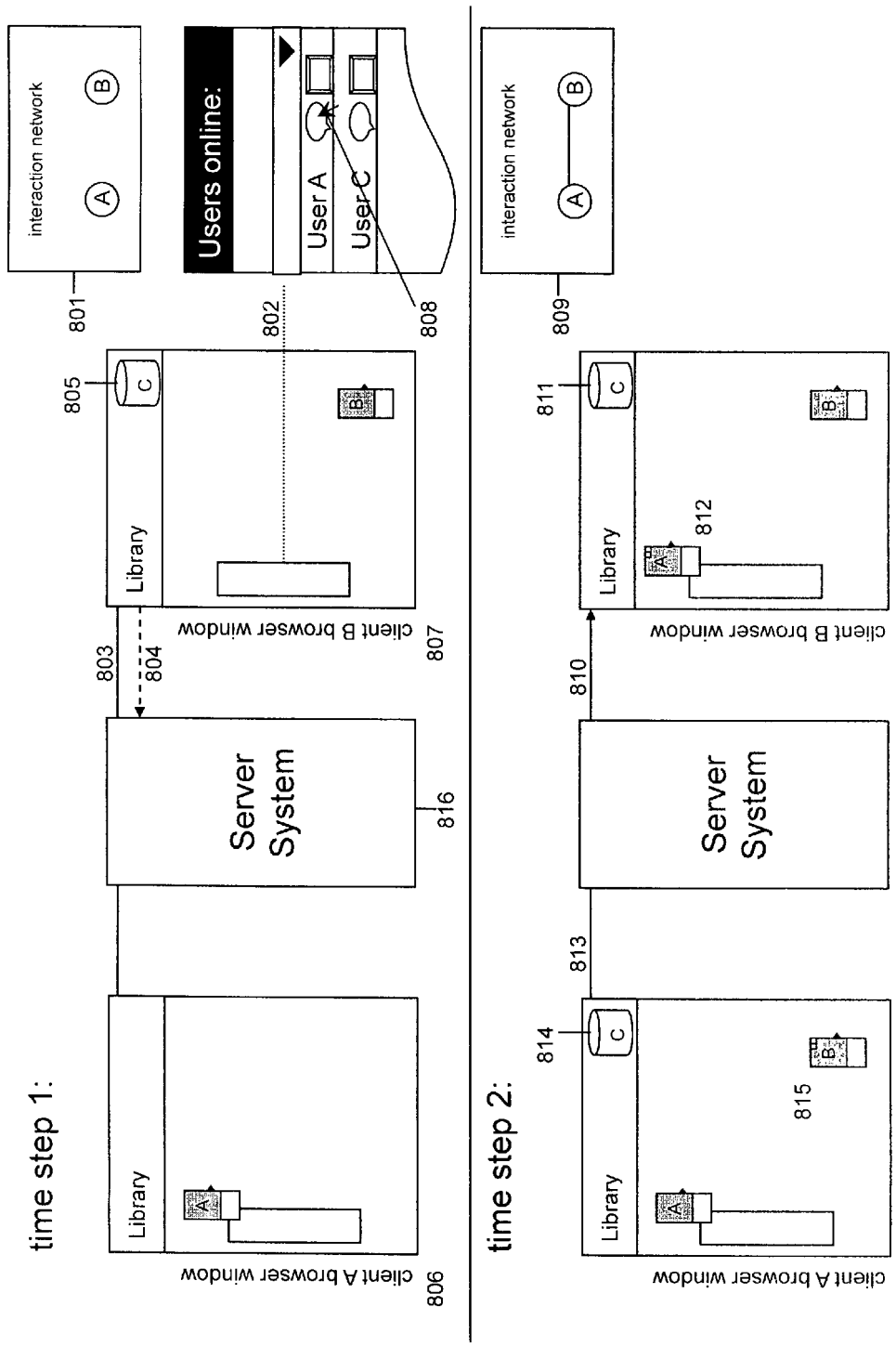
FIG. 8 Initiation of Interaction

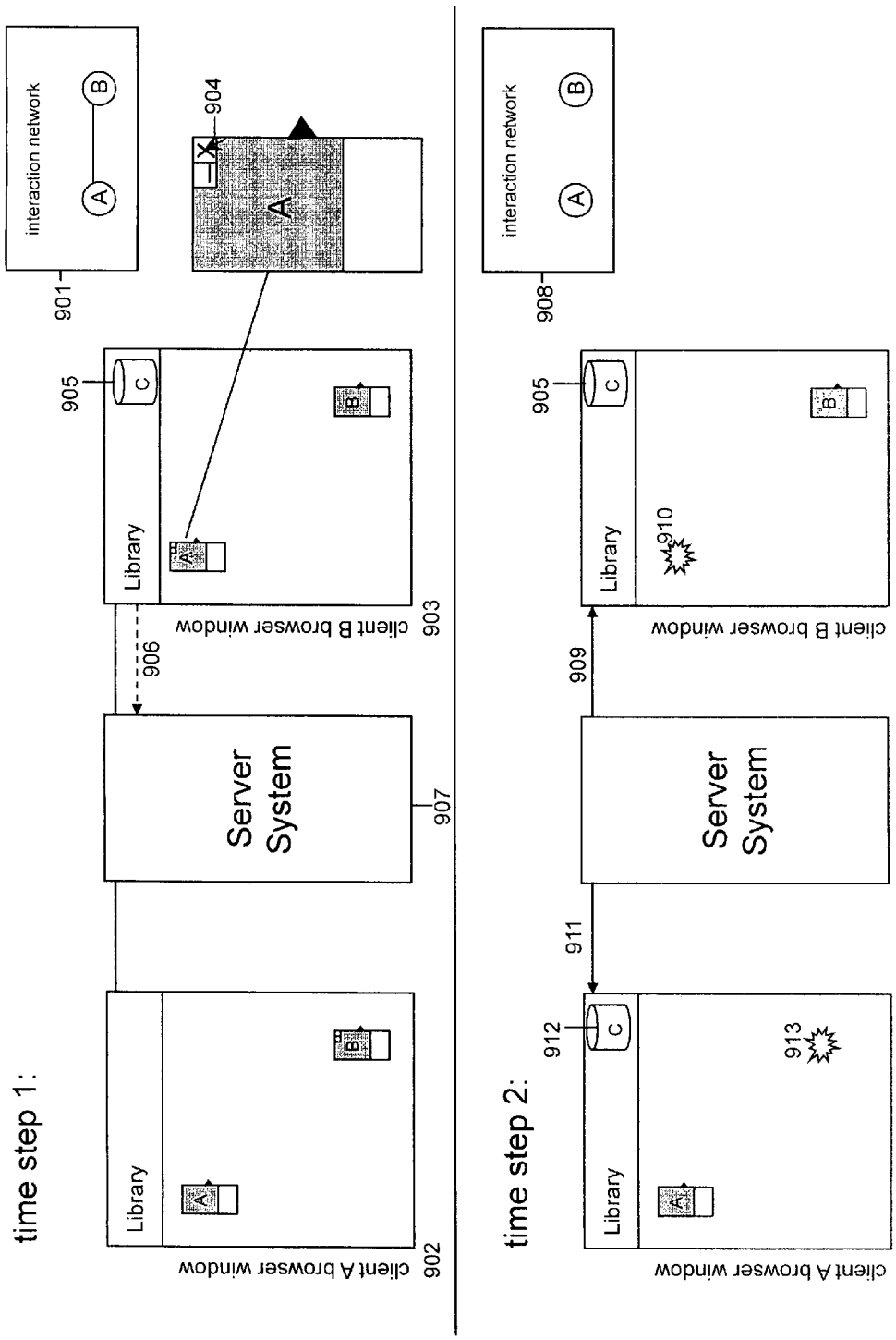
FIG. 9 Termination of Interaction

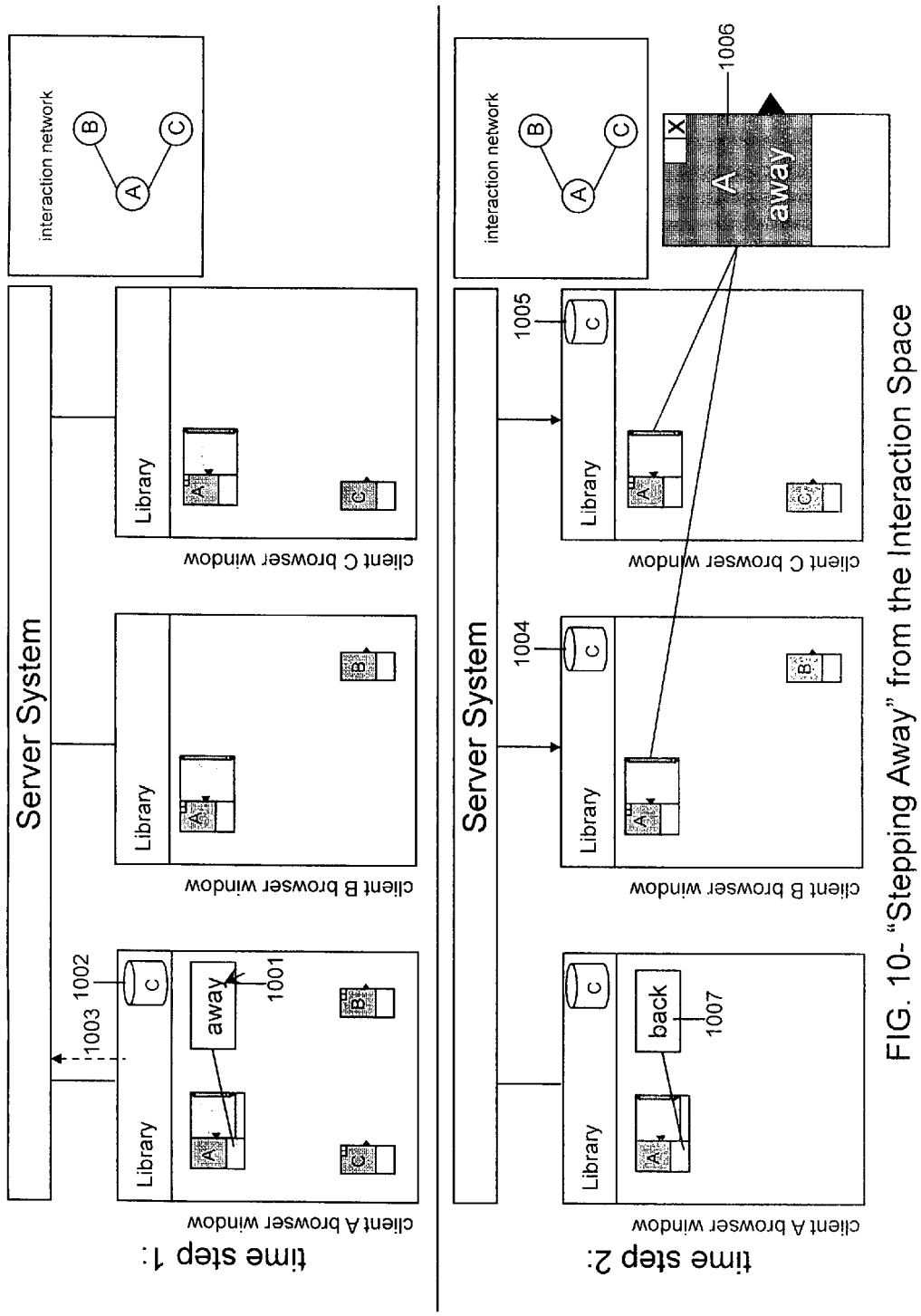
FIG. 10- "Stepping Away" from the Interaction Space

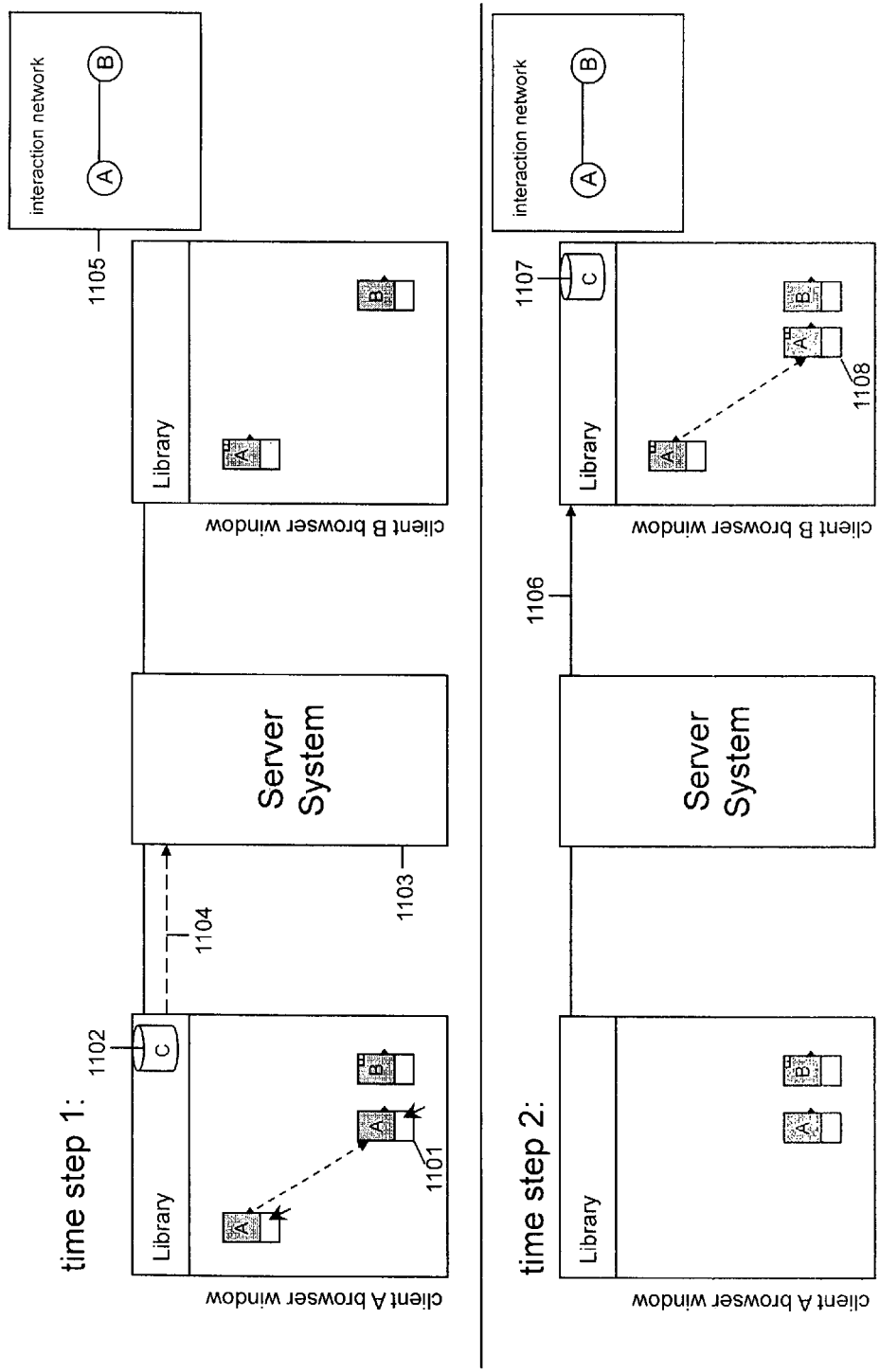
FIG. 11 Movement Action

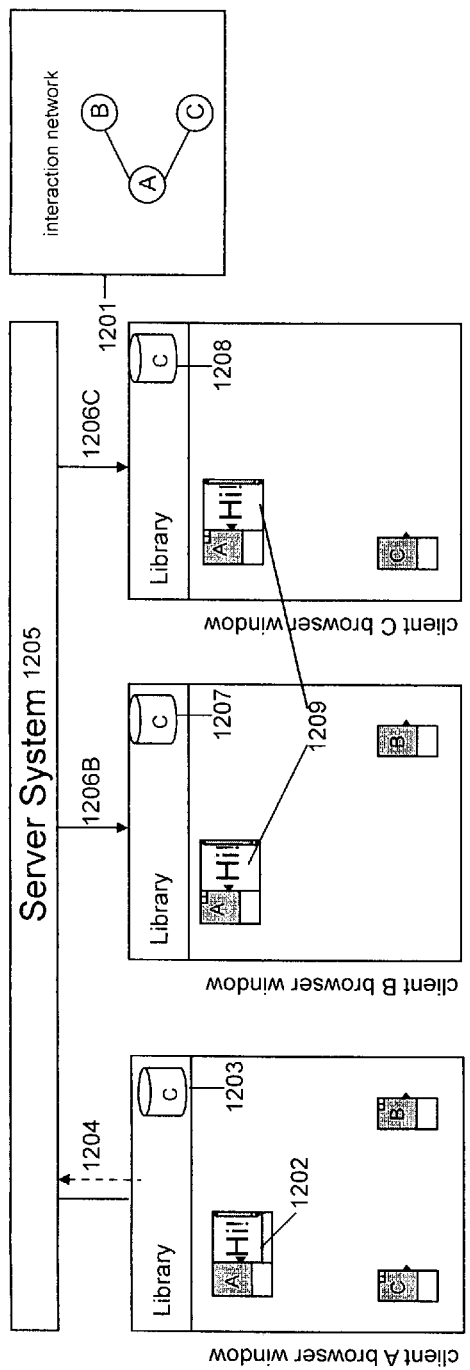
FIG. 12- Broadcast Mode

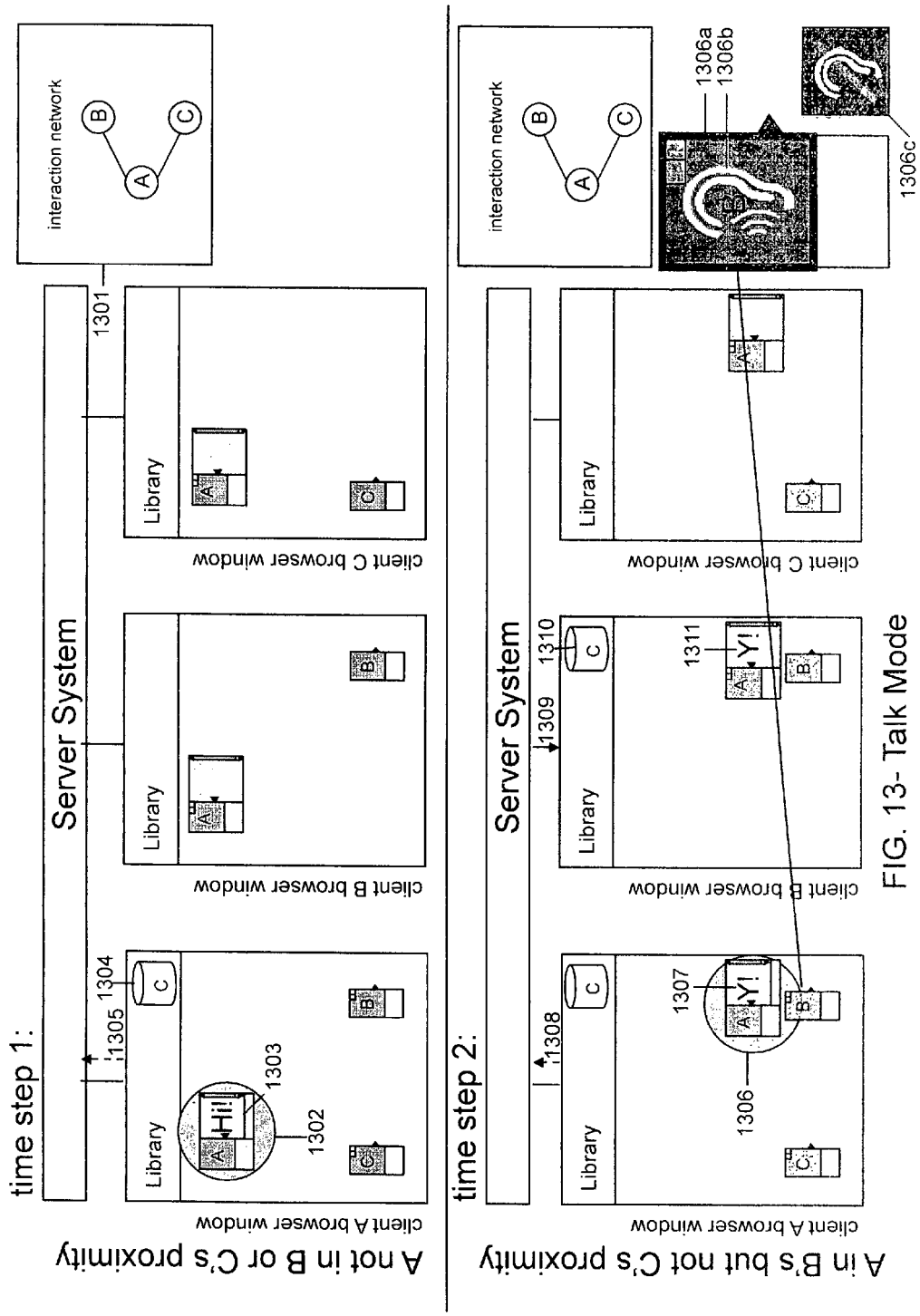
FIG. 13- Talk Mode

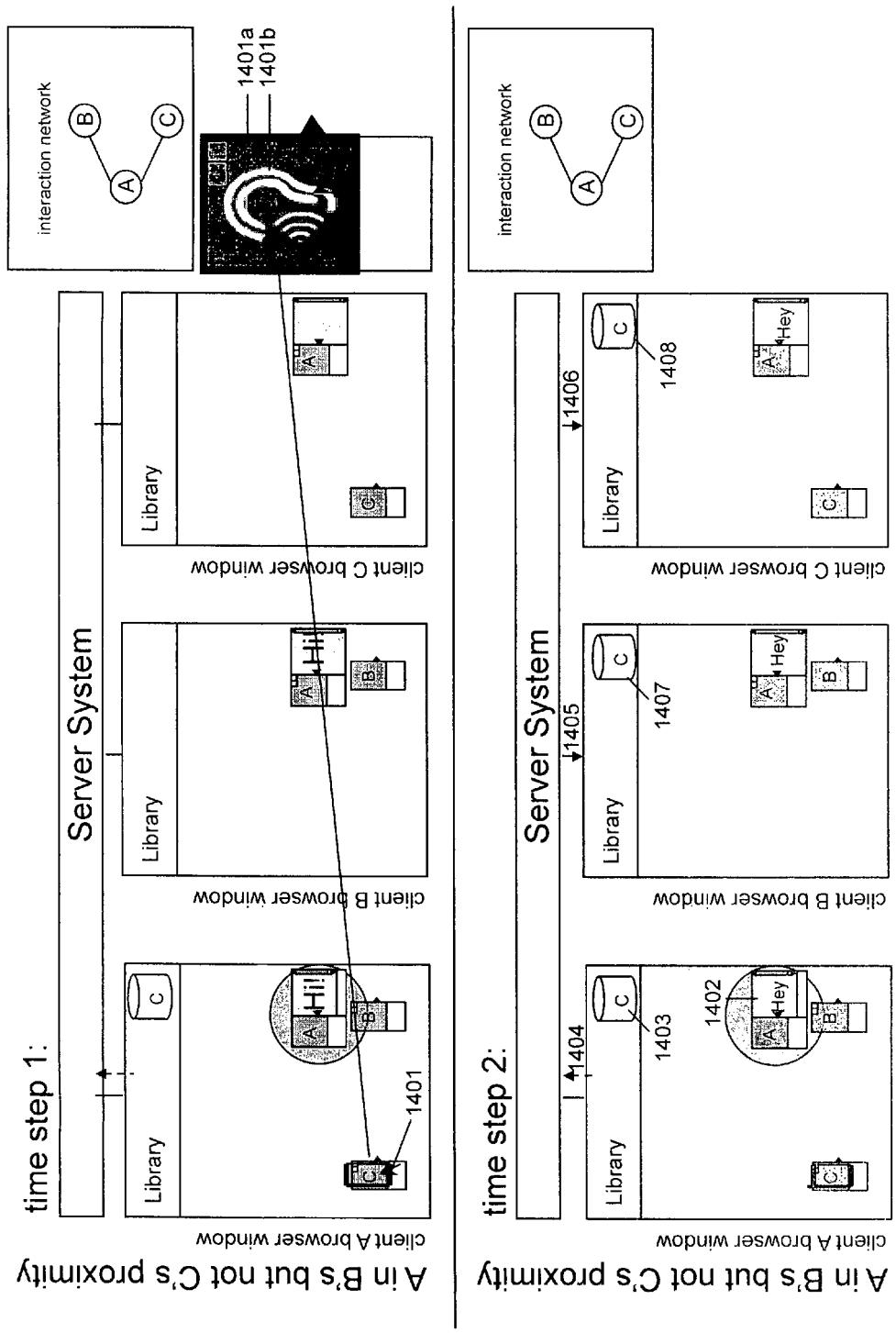
FIG. 14 - Hybird Mode

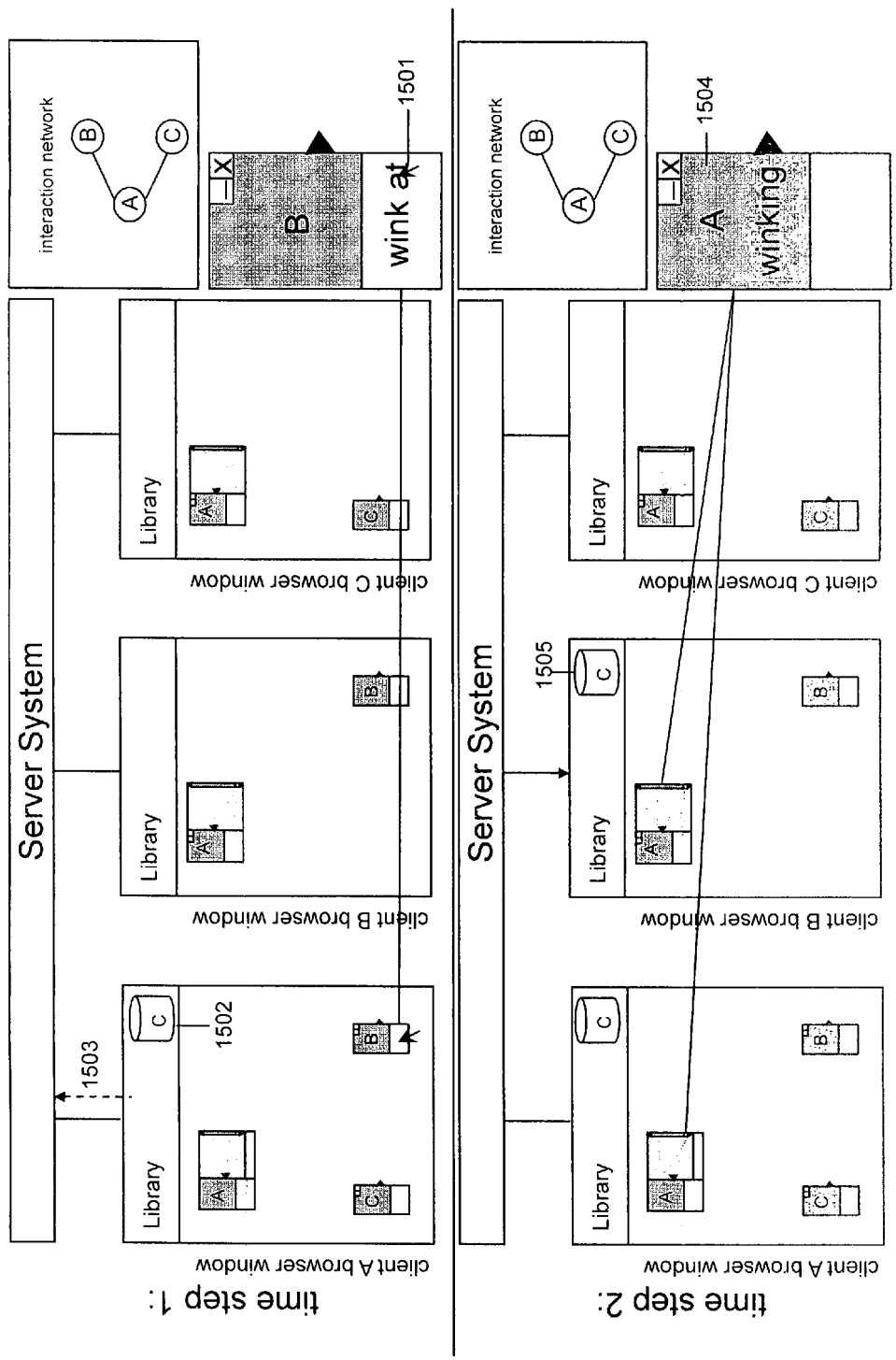
FIG. 15- Directed Actions

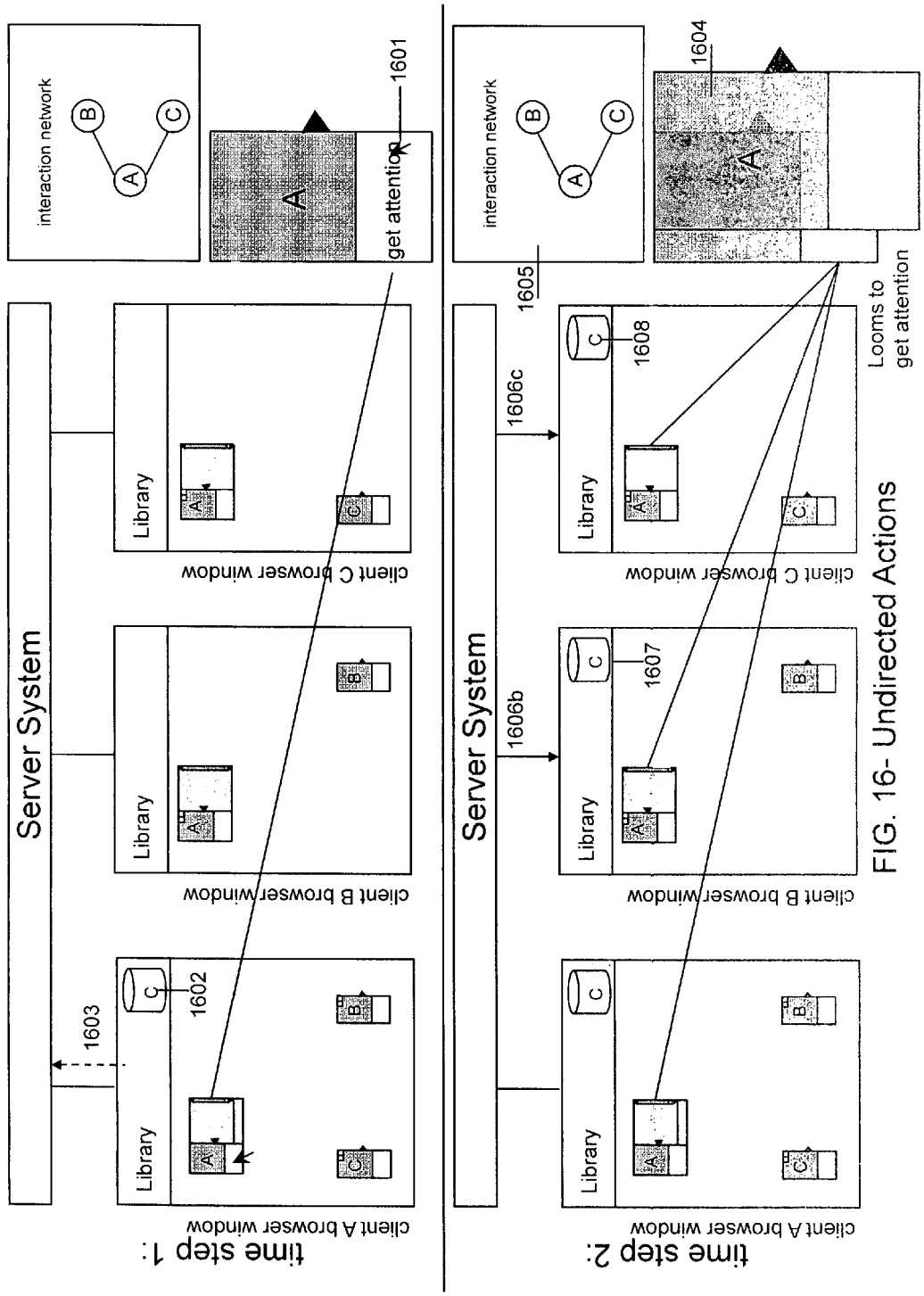
FIG. 16 - Undirected Actions

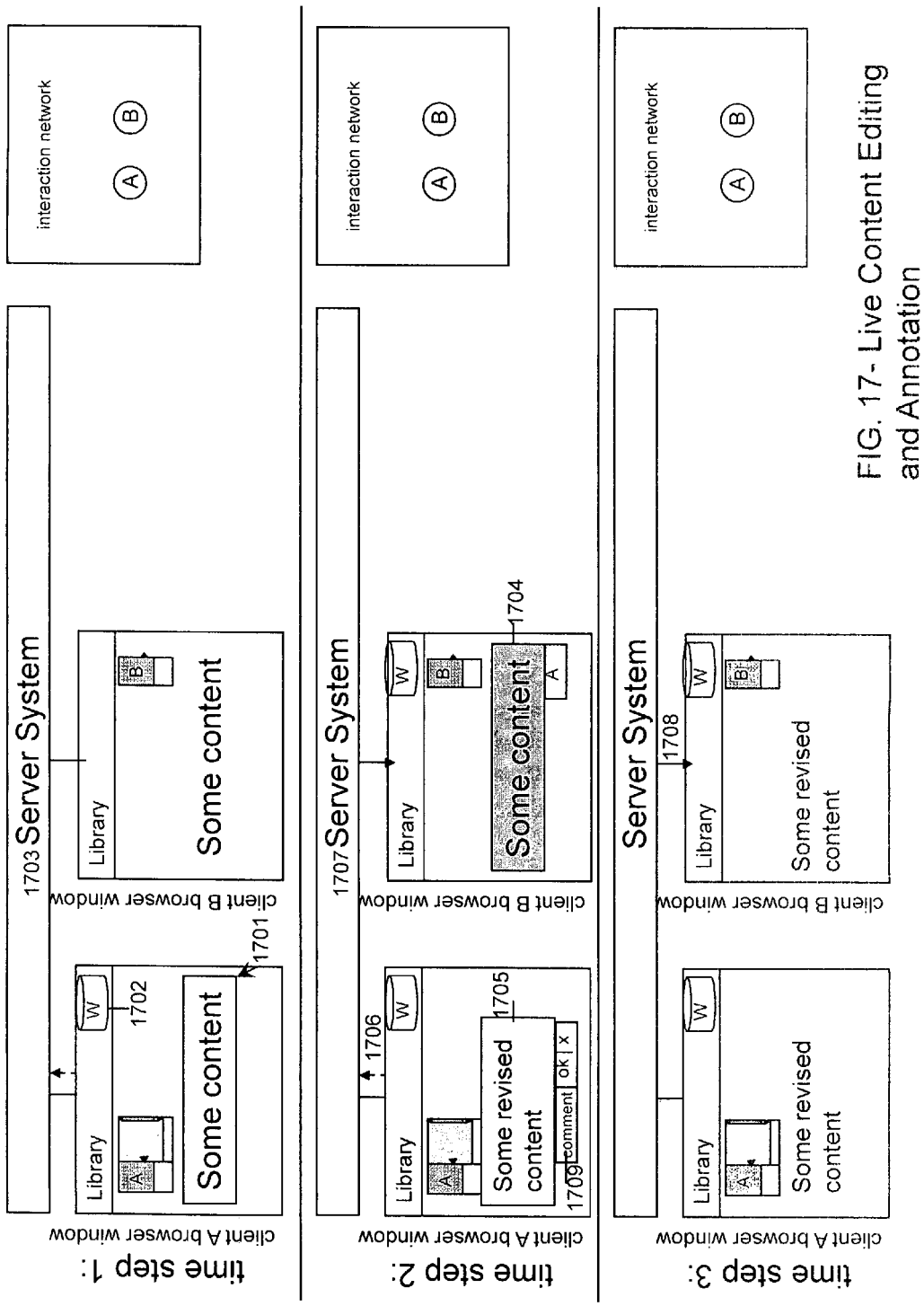
FIG. 17 - Live Content Editing and Annotation

SYSTEM AND METHOD FOR REAL-TIME, MULTI-USER, INTERACTIVE AND COLLABORATIVE ENVIRONMENTS ON THE WEB

CROSS-REFERENCE TO RELATED APPLICATIONS

This application claims the benefit of provisional patent application Ser. No. 60/847,910, filed on 2006 Sep. 29 by the present inventor.

FEDERALLY SPONSORED RESEARCH

Not applicable

SEQUENCE LISTING

Not applicable

BACKGROUND

1. Field of the Invention

This invention relates to a computer method and system that provides multi-user environments over computer networks such as the Internet, and more specifically a method and system that allows users to interact and collaborate over the web in real-time.

2. Technical Background

The Internet, as a vast network of disparate computing devices communicating over common standards and protocols, is today the largest and most accessible information store in human history. Most of this information is stored as web pages on the World Wide Web (WWW or web). Typically, there are two important components involved in a web transaction: a server system (web server) and a client system (client). The server system is comprised of a hardware component (i.e. a computing device) and a software component (i.e. a web engine). The web engine controls the web server's hardware component to perform three main functions: listen for web requests (i.e. HTTP requests—defined below) from client systems, index and fetch the requested information, and send an appropriate response back to the client. The web engine indexes each piece of information (or "file") stored on the web server using a globally unique reference known as a Uniform Resource Locator or URL.

The client system is comprised of a hardware component (i.e. a computing device) and a software component (i.e. a web browser or browser). The web browser controls the hardware component of the client system as to enable four functions: interface with the user to capture the user's web requests, contact the appropriate web server and submit the request, wait for the web server's response, and display the web server's response in a manner that is meaningful and appropriate for the user.

When the user requests a web page, either by typing a URL into the browser or by performing some other action such as clicking on an HTML (i.e. Hyper Text Markup Language—defined later) hyperlink, the browser sends the user's request to the server using a common protocol known as the Hyper Text Transport Protocol or HTTP. In communicating the user's request, the browser must first open a HTTP connection with the server and transmit the requested URL. The HTTP connection remains open while the browser waits for the server's response.

After receiving the request from the browser, the server fetches the file associated with the URL and transmits the file to the browser. If the URL is invalid, or no file is associated with it, then an appropriate error response is sent. Once the response is sent, the server closes the HTTP connection. Any further requests that the user might make would require the browser to open a fresh HTTP connection to initiate the entire process just described. Therefore, HTTP is commonly known as a "stateless" protocol because there is no persistent connection between client and server.

The browser, having received the server's response, must now display it in a meaningful manner for the user. The vast majority of web pages are encoded using a language known as Hyper Text Markup Language (HTML). HTML is a standard language for expressing the layout of sets of objects (e.g. textbox areas, drop down menus, etc.) and their structural relationships. The browser interprets the HTML expressions and renders them within the browser window, resulting in a displayed web page.

The server's response may also reference programs that define the "look and feel" of the web page. These programs, also stored on the server system, are automatically downloaded and interpreted by the browser to allow for the dynamic alteration of the objects within the browser window. These programs, for example, can alter the size, color, and position of an object in response to a user's action. New objects can be created and old objects can be completely removed from the web page. These are just some of the ways in which web application developers can programmatically create a more responsive and/or predictive user interface on web pages.

These programs are typically written in a language called EMCAScript (hereafter JAVASCRIPT) because a platform to interpret JAVASCRIPT programs is pre-packaged with all modern browsers. Other common platforms include the JAVA Virtual Machine, which is used to execute JAVA Applet programs, and the ADOBE FLASH Player, which interprets ADOBE FLASH Script programs. By writing programs in these various languages, JAVASCRIPT, JAVA Applet, and ADOBE FLASH Script, developers can create sophisticated user interfaces for web pages.

Web 2.0, a recent movement in web application design, with the goal of making web pages even more responsive to the user's needs, is centered on a new use of the JAVASCRIPT language. Asynchronous XML and JAVASCRIPT (AJAX) is a powerful set of JAVASCRIPT technologies supported by modern browsers that allows the client system to make remote procedure calls with the server (via HTTP). These calls enable web developers to shift more of the business logic processing to the client system: JAVASCRIPT programs that use AJAX can dynamically request information or services from the server in response to A. a changed state, and/or B. a user's action. The programs can also process the server's response and make any necessary updates without having to completely re-download or re-render the web page. In contrast, non-AJAX web applications place business logic computations on the server: each new update requires trips to the server and then back again. With these functions shifted onto client systems, AJAX allows web applications to be much more responsive to the user.

CONTEXT

Over the years, the web has grown into the most popular means of accessing information on the Internet. Throughout that time, dramatic shifts in what we used the web for have occurred: as web application designers infused their websites with creative new features, the web has been transformed several times over—starting as a medium to simply post, retrieve, and view basic web pages (simple textual and graphical HTML pages), to its current inception as a medium that supports rich web services. Among the many services available today, for example, users can access up to the minute news, check their electronic mail (email), watch and download videos, perform financial transactions, buy and sell goods, etc. With the proliferation of web-enabled devices, particularly mobile computing devices such as cell phones and personal digital assistants (PDA), access to the web has literally become pervasive: the web has truly become a place where almost all informational demands are met—where information is at your fingertips anyplace, anytime.

What has remained constant throughout this evolution, however, is that all web applications up to the current day have been designed with one principle in mind: to satisfy the user's informational demands. For example, there are websites that help users find the lowest prices on certain goods; others that keep them up to date with the latest news articles and blogs; and others still, i.e. search engines, that will help them answer pretty much any query that they have by referring them to the relevant web pages. Indeed, the common strategy in making a successful web site is to exploit new ways of connecting users with new fauna of information. This common strategy or design principle will be referred to as the information driven paradigm of web application design.

There are some indications, however, that the information driven web applications of today lack in at least this regard: the user experience is largely isolated and solitary. A certain news article on the web, for example, might be hosting hundreds of viewers concurrently and yet, these users, aside from the occasional posted comment, are all oblivious to any trace of the others. One manner of going beyond the information driven paradigm is to make the presence of these users immediate and apparent to the others so that they might engage in spontaneous social interactions over the web, e.g. engage in a real-time discussion over the news article.

The recent popularity in online dating and social networking sites speaks to the desire of users to have the web as a more social space. These classes of web applications, however, largely fail to promote social interactions that are reflective of real-world interactions. These sites, largely following the information driven paradigm described above, only allow for rather primitive interactions: users might send messages to each other, post comments on profile pages, partake in a discussion board, etc. Instead of offering opportunities to interact online—in real time, these sites depend on users to setup their own offline face-to-face meetings at some point in the future. As information driven web applications, these websites suffer from the drawback of being—at best, informational exchanges. They are not environments where users can socially interact.

Yet another argument for having web-environments that allow users to interact in real-time is that users on the same web page usually share a common motivation. The simple reason why people aggregate on dating sites, for example, is that they all want to meet other people. Likewise with those who go to online trading sites—these are people who want to buy and sell items. And because users of the same web page share a common motivation, e.g. to date, to buy, to exchange knowledge, it is therefore easy to see that people, if allowed to interact in ways that approximate real-life interactions, will naturally be led to online collaborations: open source programmers, for example, who are allowed to interact with other likeminded programmers will naturally coalesce and form collaborative projects. The new interaction driven paradigm then, is to amplify these shared motivations by making the web into a real-time, multi-user environment where users can A. interact with each other naturally, and B. collaborate with others on joint projects.

Web applications that are interaction driven fulfill the following requirements. First, each user is embodied in a graphical representation (i.e. avatar) that uniquely identifies them and allows their presence to be immediate and apparent to other users of the website. Second, users can perform actions through their avatars; their actions will be seen by the other users in real-time. These actions might include, for example, conversing with others (i.e. speaking or instant messaging), physically interacting with other avatars (e.g. bumping into other avatars), etc. By invoking these actions, users are said to be interacting with other users. Third, users can manipulate the contents of the web page (e.g. highlight an area and annotate it—or edit a textual section); the user's manipulations, when completed, will be seen by the other users in real-time. In this manner, users are said to be collaborating with other users.

PRIOR ART

U.S. Pat. No. 6,958,981 to Hemminger (2005) describes a system that allows users to share web experiences by synchronizing their scrolling positions on a shared web page. Users must first designate a host whose screen and scrolling position are broadcasted to the other users by the system. As the host scrolls his screen, messages are broadcasted to the other systems to scroll their users' screen to the same position. In this way, non-host users always see what the host is currently seeing.

Although the invention described by Hemminger helps establish common ground among users (i.e. they all see the same thing), it falls short of fulfilling the requirements of the interaction driven paradigm for several reasons. First, there is no sense of presence among the users because there is no representation of who is viewing the shared page. Second, there is no interactivity among the group members—most members are merely passive viewers to what the host is doing. Third, and perhaps because there is no sense of presence among users, there is also no emerging sense of interactive or collaborative potential in the system described. Indeed, group interactions must be facilitated by some other means, e.g. through voice conferencing.

Another system that allows users to share web browsing experiences is shown in U.S. Pat. No. 6,240,444 to Fin et al (2001), where users not only synchronize their scrolling positions on a shared web page, but also are aware of other users' actions. The invention includes a software system known as a "Web Sharing User Interface" that acts as a proxy for the user. The proxy software sends information about what the user is currently doing to other proxies. Likewise, it also receives and interprets similar information coming from the other proxies. Through these proxies, the users are able to synchronize many elements of their web experience. For example, the system described by Fin et al guarantees that users will always be on the same web page; users can manipulate elements of a web page (e.g. enter text into a field), and these manipulations will be seen by the others; users can see the mouse movements of the other users; users can also highlight and annotate regions of the web page—to the effect of which the other users will be aware of such actions.

The invention described by Fin et al, however, has several disadvantages. First, users are not embodied in the web page: the users' mouse cursor serves as his representation to the others and it is undifferentiated from the other mouse cursors on the screen. Second, users' actions can come into potential conflict. For example, two users might be filling out the same text field at the same time, which potentially leads to data inconsistencies among the users. Fin et al do not provide any method of avoiding these conflicts, such as allowing users to "lock" the areas they are working on. Third, as users are not uniquely identifiable, so too are the users' actions anonymous. In the system described by Fin et al, it is hard to tell who is doing what, which might disrupt collaborative efforts.

A disadvantage of both the Fin et al and Hemminger inventions is that they follow strict WYSIWIS (What You See Is What I See) design principles. This means that all members of the group see exactly the same view. If, for example, any of the users of Fin et al's invention leave for another web page, the strict WYSIWIS rules require that all of the other users join him at the other web page. That is to say, requiring all users to see the same thing at the same time can be quite disruptive to a group environment.

Strict WYSIWIS interfaces have been shown by Stefik et al (Stefik 1987) to be less effective in striking the necessary balance between the opposing needs of the user and the needs of the group in multi-user environments. Therefore, in order to balance these opposing needs, Stefik et al recommend using relaxed WYSIWIS interfaces, i.e. abandoning the notion that all users must see the same thing at the same time.

Another disadvantage to both of these inventions is that system initialization requires a lot of work on the user's part: users have to tell their proxies who the other users of the peer-group are. For the average user, the information that is required to register a peer might be overburdening. For example, the users might need to know technical details such as their peers' IP addresses. Second, it forces peer groups to be static and unchanging. In both inventions, it is unclear whether users can be added or deleted from the group once a session is started. Clearly, peer groups that are dynamic, where friends (and strangers i.e. those not in one's initial peer group) can come and go are much more compelling than static groups. Therefore, in order to support dynamic peer groups, the registration and initialization requirements must be hidden from the users.

These inventions require that the user install software other than a web browser. The disadvantage of this is that users are often reluctant to install third-party software applications to enable some new web experience. Additionally, if the software is installed, it is hard to ensure that the version being used is consistent across users—i.e. it is hard to keep user versions up-to-date. Therefore, it is desirable to mitigate or completely eliminate the requirement for additional software other than a typical web browser.

Prior art on interactive spaces can be found in virtual world (or virtual reality) systems. U.S. Pat. No. 6,219,045 to Leahy et al (2001) shows a system that allows users to interact in a 3D world environment. The environment is comprised of various virtual rooms which users can enter into and interact with other users. In the virtual rooms the users are each embodied by avatars; the user's view of the room is taken from the avatar's perspective. The users can command their avatars to move around the room thereby allowing the user to see the other users of that room. Users of a virtual room can engage in "chat-room"-like conversations: user messages are aggregated into one common output text area—the user's name is appended to each of his message in this output area so as to delineate his message from the others. The system, however, also allows for two variations of this mode of conversation. First, in what Leahy et al refer to as "talk"-mode, users can allow their messages only to be seen by others within a certain distance from their avatar. Second, in "whisper"-mode, users can allow their messages only to be seen by a specific user.

Although the invention described by Leahy et al allows users to be embodied in a virtual space, it falls short of the goal of having each user's presence immediate and apparent: as mentioned above, the user's view of the virtual room is taken from the perspective of the avatar, and therefore, certain users in the avatar's "blind spot" would not be immediately apparent to the user. The user would have to move around the room to see these other users.

Leahy et al's invention limits users to act in one of two modes: move around the virtual room, and chat with other users. Movements are represented in the virtual room while chatting is contained in the text output area. In other words, there is a disconnection between the conversation stream and the users' actions. It is therefore desirable to have all actions be represented in a single "interaction space", e.g. to have avatars not only represent user movements, but also user dialogues. Furthermore, users of Leahy et al's invention are not allowed to manipulate the environment (or virtual room) they are in, and therefore, are without means to collaborate with each other.

In Leahy et al's invention, users are powerless in controlling the state of the virtual rooms: the server is responsible for setting the maximum number of users in a room; users cannot screen other users from entering the room; nor can users ask others to leave the room; or control the footprint (or size) of other users' avatars. It is desirable to give users these controls—among others, in order for them to tailor their interaction space (e.g. virtual room) in manners which they see fit and conducive to their interactive experience.

Leahy et al's invention also allows us to consider the appropriateness of 3D environments for interaction driven web applications. Although current web technologies support the construction of 3D web environments through the use of Virtual Reality Modeling Language (VRML), VRML has been largely overshadowed by HTML: a vast majority of web information is encoded in HTML rather than VRML. This means that a large majority of the web's information is represented in 2D rather than 3D. Therefore it is desirable of the system to have a space where interactions occur in 2D so that it is graphically compatible with how the vast majority of web pages are represented. Having a 2D rather than 3D representation allows for a graphical interface that gives the user a "bird's eye view" of the interaction space—thus, all users of that space can be immediate and apparent to each other. A 2D interface would also be easier to navigate in using standard mouse and keyboard actions than a 3D interface.

DRAWINGS

FIG. 2 is a flow diagram of a routine that establishes, maintains, and terminates persistent HTTP connections between client and server.

FIG. 3 illustrates how each web page has two layers—a web content layer, and an interaction space.

FIG. 4 shows an example embodiment of the user's avatar.

FIG. 5 illustrates how other user's avatars might be embodied.

FIG. 6 illustrates how the interaction network is represented by the server system.

FIG. 7 illustrates the invitation pane that allows users to invite others into their interaction space.

FIG. 8 is a diagram that illustrates how users invite others into their interaction space.

FIG. 9 is a diagram that illustrates how users terminate or "dis-invite" users who are in their interaction space.

FIG. 10 illustrates how users can hide the other avatars in their interaction space by "stepping away" from their interaction space.

FIG. 11 is a diagram that illustrates users' movement actions.

FIGS. 12-14 illustrate the various modes of conversing with other users, i.e. broadcast, talk, and hybrid.

FIG. 15 is a diagram of directed actions.

FIG. 16 is a diagram of undirected actions.

FIG. 17 is a diagram that illustrates how users can collaborate in real-time by editing and/or annotating the contents of a web page.

REFERENCE NUMERALS

Figure 1:
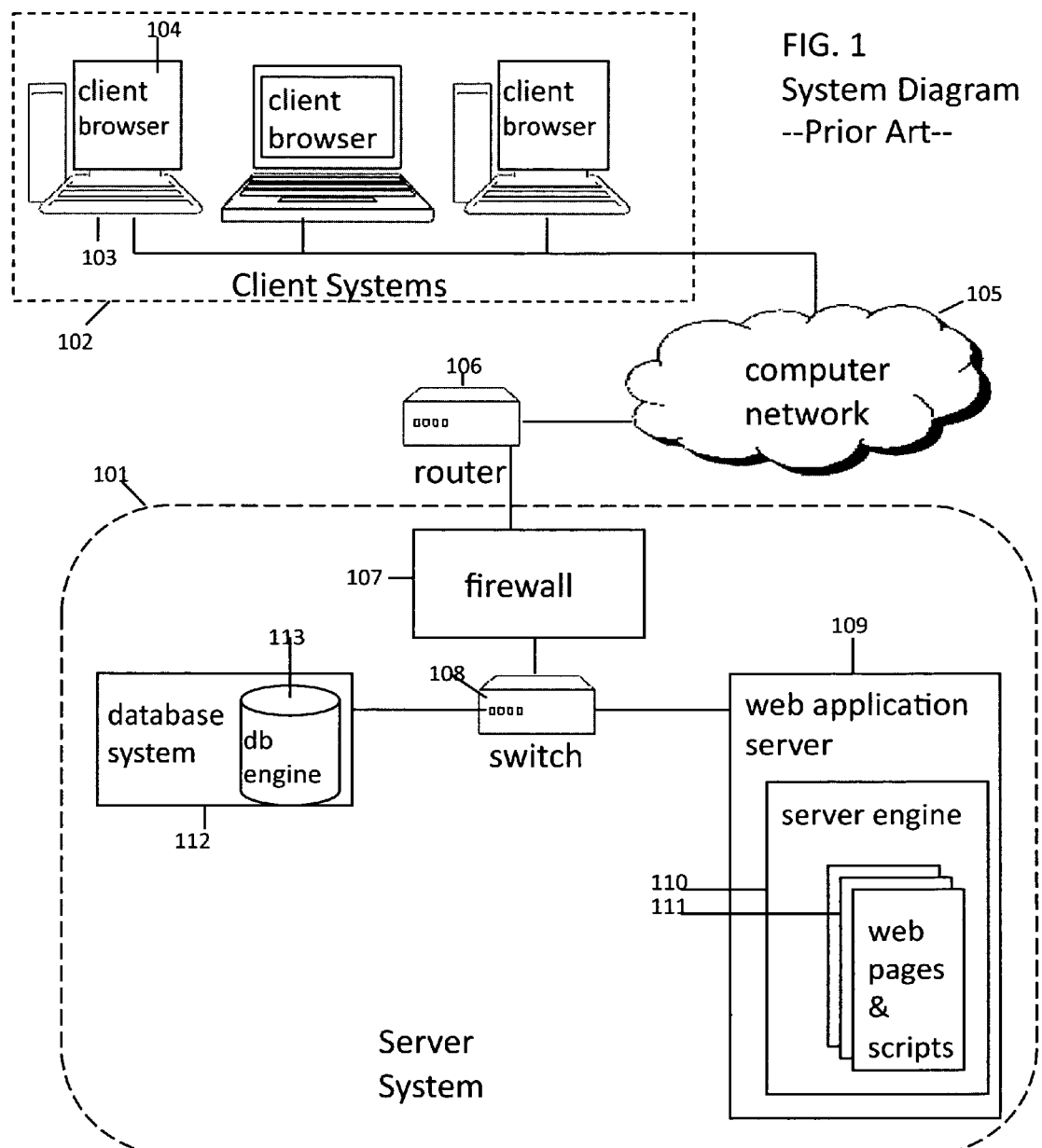
FIG. 1 is a system diagram illustrating details of the server system and client systems

| | |
|---|---|
| 101 | server system |
| 102 | client system |
| 103 | client system computational device |
| 104 | client browser |
| 105 | computer network |
| 106 | router device |
| 107 | firewall |
| 108 | switch |
| 109 | web application server |
| 110 | server engine |
| 111 | web pages & scripts |
| 112 | database system |
| 113 | database engine |
| 201 | create hidden iframe state |
| 202 | persistent connection request state |
| 203 | store and index http connection state |
| 204 | error message state |
| 205 | successful establishment of persistent connection state |
| 206 | listening state |
| 207 | event check state |
| 208 | logoff event check state |
| 209 | close persistent connection state |
| 210 | process event state |
| 211 | transmit data check state |
| 212 | fetch persistent connection and thread state |
| 213 | continue thread state |
| 214 | transmit data state |
| 215 | re-suspend thread state |
| 301 | interaction space |
| 302 | web content layer |
| 303 | web content |
| 304 | interaction space avatars |
| 401 | user's picture |
| 402 | action menu area |
| 403 | text input area |
| 404 | user's text output area |
| 405 | demarcation symbol |
| 406 | scroll bar |
| 407 | minimize text output button |
| 408 | minimize text output button |
| 501 | minimize button |
| 502 | close button |
| 503 | text output area |
| 504 | other user's action menu area |
| 601 | interaction network |
| 602 | user node |
| 603 | interaction edge |
| 604 | user node |
| 701 | invitation pane |
| 702 | invitation button |
| 801 | interaction network |
| 802 | invitation pane |
| 803 | client B bidirectional communications channel |
| 804 | client B non-persistent communications channel |
| 805 | client B controller library |
| 806 | client A browser |
| 807 | client B browser |
| 808 | client A invitation button |
| 809 | interaction network |
| 810 | client B bidirectional communications channel |
| 811 | client B controller library |
| 812 | client A avatar |
| 813 | client A bidirectional communications channel |
| 814 | client A controller library |
| 815 | client B avatar |
| 901 | interaction network |
| 902 | client A browser |
| 903 | client B browser |
| 904 | close avatar action |
| 905 | client B controller |
| 906 | client B non-persistent communications channel |
| 907 | server system |
| 908 | interaction network |
| 909 | destroy client A message |
| 910 | client A destroyed |
| 911 | destroy client B message |
| 912 | client A controller |
| 913 | client B destroyed |
| 1001 | away button |
| 1002 | client A controller library |
| 1003 | client A non-persistent channel |
| 1004 | client B controller library |
| 1005 | client C controller library |
| 1006 | client A's avatar on client B and C's systems |
| 1007 | back button |
| 1101 | client A movement action |
| 1102 | client A controller library |
| 1103 | server system |
| 1104 | client A non-persistent connection |
| 1105 | interaction network |
| 1106 | movement command |
| 1107 | client B controller library |
| 1108 | execution of movement command |
| 1201 | interaction network |
| 1202 | client A message |
| 1203 | client A controller library |
| 1204 | client A's non-persistent channel |
| 1205 | server system |
| 1206B | client B's bidirectional channel |
| 1206C | client C's bidirectional channel |
| 1207 | client B's controller library |
| 1208 | client C's controller library |
| 1209 | display of client A's message |
| 1301 | interaction network |
| 1302 | proximity indicator |
| 1303 | client A's message |
| 1304 | client A's controller library |
| 1305 | client A's non-persistent channel |
| 1306 | client A's proximity indicator |
| 1306a | "within range" border indicator |
| 1306b | "within range" icon |
| 1306c | "not within range" border and icon |
| 1307 | client A's second message |
| 1308 | client A's non-persistent channel |
| 1309 | client B's bidirectional channel |
| 1310 | client B's controller library |
| 1311 | client A's second message displayed on client B |
| 1401 | client A "clicks-to-allow" client C |
| 1402 | client A message |
| 1403 | client A controller |
| 1404 | client A non-persistent channel |
| 1405 | client B bidirectional channel |
| 1406 | client C bidirectional channel |
| 1407 | client B's controller library |
| 1408 | client C's controller library |
| 1501 | directed action button (e.g. "wink at" |

-continued

| | |
|---|---|
| | button) |
| 1502 | client A's controller library |
| 1503 | client A's non-persistent channel |
| 1504 | client A's avatar performing winking action |
| 1505 | client B's controller library |
| 1601 | undirection action button (e.g. "get attention" button) |
| 1602 | client A's controller library |
| 1603 | client A's non-persistent channel |
| 1604 | client A's avatar performing "get attention" action |
| 1605 | interaction network |
| 1606B | client B's bidirectional channel |
| 1606C | client C's bidirectional channel |
| 1607 | client B's controller library |
| 1608 | client C's controller library |
| 1701 | client A lock-request region |
| 1702 | client A's web content controller |
| 1703 | server system |
| 1704 | client B's view of the lock region |
| 1705 | editable area |
| 1706 | client A's non-persistent connection |
| 1707 | server system |
| 1708 | client B's bidirectional channel |
| 1709 | comment button |

DETAILED DESCRIPTION

First Embodiment

The system diagram illustrated in FIG. 1 shows the two main systems of the first embodiment, the server system (server) 101 and the client systems (client) 102, connected through a computer network 105. The computer network 105 may be any public or private network that supports common protocols like TCP/IP, such as the Internet. Information packets between the server system 101 and client systems 102 are forwarded over the computer network 105 through a router device 106. All incoming information packets to the server system 101 must first pass through a firewall 107 which helps prevent unauthorized access to the server system 101. Authorized information packets are then shuttled via a switch 108 which helps route information packets on the server system's intranet 101. As shown in FIG. 1, all of the devices within the server system's intranet 101 are connected to the switch 108, thereby allowing the devices to communicate with any other device in the server system 101. The various components connected to the switch 108 may operate either within a local area network or wide area network.

The server system 101, in addition to the firewall 107 and switch 108 just mentioned, is also comprised of a web application server 109 and a database system 112.

The web application server (web server) 109 is comprised of hardware components controlled by a server engine 110 that allows the web server 109 to listen for, process, and respond to incoming HTTP requests. The server engine 110 is populated with the content associated with the web application, i.e. the web pages and their associated scripts 111 (described below), and serves this content to the client systems. One skilled in the art would appreciate that the web pages 111 can be dynamically generated and custom tailored to the user's request through a programmed logic written in a language that is native to the server engine 110 such as PHP, JAVA, Ruby, etc. The web server 109 can also be programmed to maintain certain business-logic representations such as the interaction network (described below). It is also able to store more permanent data required by the web application using the database system 112.

The database system 112 is comprised of a computational device that runs a software application known as a database engine 113. The database engine 113 controls the hardware of the computational device to allow for the storage, indexing, fetching, and updating of more permanent business-logic data, e.g. user id, user names, etc.

The client systems 102 serve as platforms for the client-side user interface (or simply user interface). Each client system 102 is comprised of a computing device that runs a web browser 104. The web browser 104 fetches the web pages of the web application 111, and executes their associated client-side scripts (or simply scripts). The scripts 111, as described in the "Technical Background", are a set of programs that define the "look and feel" of objects that are rendered on the web page—they essentially define how the web pages will act as user interfaces.

In this embodiment, the scripts 111 are written in the JAVASCRIPT language. In other embodiments, and as discussed above, the choice of programming language is open to other platforms, i.e. JAVA Applets and ADOBE FLASH. The descriptions of the client-side scripts 111 are given in a language-independent fashion so that they can be interpreted by someone skilled in the art for implementation in any of these three platforms.

The only area of any significant divergence between these three platforms is how client-server communications are conducted. On both the JAVA Applet and ADOBE FLASH platforms, there is a way to create socket connections, which are persistent bidirectional channels. This allows the client 102 to initiate information updates with the server 101 and vice versa. In JAVASCRIPT, however, information is communicated to the server 101 through AJAX—a technique that is reliant on HTTP. As discussed in the "Technical Background" of this specification, HTTP is a stateless protocol, which for the purposes of this discussion means that the client 102 may initiate information updates with the server 101, but not the other way around. In other words, under HTTP, the server system 101 has no way of contacting the client system 102.

How then can we achieve real-time synchronization between client and server system states on the JAVASCRIPT platform if there is no way for the server to initiate information exchange using AJAX channels?

One solution, known as "polling", is to queue the information on the server system 101 and to have the client system 102 periodically check back with the server 101 for any new information. For example, the client system 102 could be programmed (through a JAVASCRIPT program) to initiate a HTTP request with the server 101 at least once every second. This simple solution, however, has several drawbacks. First, HTTP transactions are resource intensive for the server system 101: if the server system 101 is to support N-clients 102, where each client 102 is polling once a second, then the server 101 must be able to handle at least N×60 requests per minute. Many of these requests may be useless. Therefore, polling—in addition to being a resource intensive technique, is also quite inefficient in its resource use. The second drawback is that polling does not offer real-time precision: the information is only as fresh as the predetermined polling frequency (e.g. 1 second precision). This lag can be quite disruptive for interactive environments. Finally, one cannot increase the polling frequency (e.g. from 1 sec to 0.5 sec) without incurring a corresponding penalty in the resources required on the server system 101.

Another solution to having real-time precision over a HTTP channel is to create what is known as a "persistent connection". Persistent connections are simply HTTP requests that are initiated by the client system 102, but are never closed by the server system 101 until the user logs off. In a typical scenario, a hidden inline frame (iframe) is created which directs the browser 104 to retrieve the contents of the iframe via a HTTP request. This request is never closed and is used by the server system 101 to "push" data to the client system 102. The data that is transmitted through this persistent connection is packaged as JAVASCRIPT expressions, which when received by the browser 104, is immediately evaluated (as part of the iframe).

One drawback to the persistent connection technique is that each persistent connection will use up a thread on the server engine 110. As there is a finite (and typically small) number of threads available to the server engine 110, there is, therefore a small and finite number of users that the server system 101 is able to support.

A solution to the thread-limit problem is to suspend the thread associated with the HTTP connection, and to resume it only when the server 101 needs to initiate a transmission of information to the client system 102. This technique, known as "continuations", has been implemented in several server engines such as Seaside, Jetty 6.0, Wee, and Continuity. Each of these server engines represents a different programming language platform: Jetty 6.0 with JAVA; Wee with Ruby, etc. Moreover, many other server engines are currently developing support for continuations.

I will now describe how continuations were used to support persistent connections within this first embodiment, thereby dramatically reducing the resource costs for these persistent connections. FIG. 2 is a flowchart diagram of how persistent connections are created, maintained, and ultimately terminated. A hidden iframe is created outside of the view of the web page 201. The browser 104 is directed to retrieve the contents of the iframe via a HTTP request 202. The request for a persistent connection, along with the user's unique identifier (i.e. user id), are encoded in the URL 202.

The continuations-enabled server engine 110, after receiving the request to make the HTTP connection persistent, indexes and stores (i.e. suspends) the thread associated with the HTTP connection using the unique identifier encoded in the URL 203. If the server engine 110 is unable to index or store the thread, an error message is sent back to the client system 102 and the connection is closed 204. If, however, this step was successful, the server engine 110 notifies the client 102 of the successful establishment of the persistent connection, and then maintains (i.e. does not close) the HTTP connection until the client 102 logs off of the server system 101 or leaves its website 205.

An event driven process is used to illustrate how HTTP connections are "continued" 206-211 of FIG. 2. The server engine 110 is in a listening state for events 206; when an event occurs, 207, the server engine 110 processes the event 210. If any data transmission to the client system 102 is required 211, the user's unique id is used to fetch the HTTP connection and its associated thread 212. The associated thread is then resumed through a continuation 213, thereby opening up the HTTP connection for transmission. The data is then transmitted to the client system 102 through the HTTP connection 214. The thread associated with the HTTP connection is then re-suspended 215, and the server engine 110 returns to the listening state 206. In the case of logoff events 208, the unique identifier is used to fetch and close the HTTP connection and its associated thread 209.

Again, the techniques just described, i.e. polling and persistent connections are only relevant to HTTP communications channels (i.e. AJAX/JAVASCRIPT) and do not relate to the JAVA Applet or ADOBE FLASH platforms. Having highlighted the only area of discrepancy among these three platforms (that relates to this system), and having shown various ways of achieving bidirectional communication between the client 102 and server systems 101 on all platforms, I now will describe the client-side scripts in a platform-independent manner.

The client-side scripts 111 can be organized using three main categories: scripts that are used for network communications i.e. the network library, programs that define the user interface of the interaction space 301 i.e. the controller library, and ones that define the user interface for the web content layer 302 i.e. the web content library.

The network library is primarily responsible for facilitating bidirectional client-server communications according to the particular platform, whether it is through socket connections or persistent connections paired with AJAX remote procedure calls. It is also comprised of functions that allow the server system 101 to make remote procedure calls of the client 102, i.e. "push functions". These functions, for example, allow the server 101 to invoke commands contained within the other two libraries (i.e. the controller and web content libraries). It is further comprised of functions that A. encode data for transport to the server 101, and B. decode data received from the server 101. In this embodiment, as described above, communications are packaged as JAVASCRIPT expressions. More specifically they are encoded using JAVASCRIPT Object Notation (JSON). In other embodiments, however, other encodings or languages (e.g. XML or simple keyword/type-token systems etc.) may be used to package the data.

The controller library is a set of classes that defines the user interface of the interaction space 301 (introduced shortly). Objects within the interaction space 301 are specified in three ways: graphical behavior (i.e. how objects look), event behavior (i.e. how the object responds to user actions), and logical behavior (i.e. how the object behaves under environmental constraints). For example, the controller library may contain functions that define an object's size, position, and color; it can specify how the object responds to a user's mouse click; and it may define a certain physics and geometry for the interaction space that all objects must operate under.

The web content library is a set of classes that defines the user interface of the web content layer 302 (described below). A fuller description of the web content library is discussed below in the context of FIG. 17.

The interaction space 301 and the web content layer 302 correspond to the two activities supported by multi-user system; i.e. multi-user interaction and collaboration. The interaction space 301 is where users can see other users and perform actions that will be seen by the others in real-time. The web content layer 302 contains the textual and graphical content of a web page. Users can annotate or edit the content 303, and their manipulations, recorded by the web content library of their client systems 102, will be seen in real-time by other users who are on the same web page. Thus, the web content layer 302 is an environment for group collaboration.

FIG. 3 illustrates how these two graphical layers are composed in the user interface. The interaction space 301 is a 2D Cartesian space that is invisibly overlaid on top of the web content layer 302. This view has several advantages. First, users are given a 2D birds-eye-view of the interaction space 301 where all of the other users 304 in the space are visible. Second, this view is compatible with how a majority of web content is presented (i.e. two-dimensionally). Third, it is a space that is easily navigated using standard mouse and keyboard actions. Fourth, the two layers act as an integrated environment. For example, when a user moves or types a message, his actions are rendered within this integrated space—and not in a separate space, like a chat region.

These two layers may be independent of each other. In other words, users that share a web content layer 302 need not share the same interaction space 301 and vice versa. This allows users to collaborate (via the web content layer 302) and interact (via the interaction space 301) with different groups simultaneously. This employment of relaxed WYSIWIS design principles also strikes a necessary balance between the needs of the group and the needs of the individual in multi-user environments.

To further empower the user, the interaction spaces 301 are designed to be individually owned. This means that each user is given full control over his interaction space 301. The user decides who is invited (and "dis-invited"), what the maximum number of users should be, etc. This is a vast improvement over previous multi-user interactive systems, where the typical "chat-room" is overcrowded and sometimes populated by objectionable characters. The manners in which the user is able to control his interaction space 301 are enumerated below.

Users are given virtual embodiment in their own interaction space 301 through graphical representations called avatars. FIG. 4 illustrates what the user's avatar may look like. The avatar contains an area that displays the user's picture 401. Underneath the user's picture 401 is an area called the "action menu area" 402 which contains a series of common actions that the user can perform like the "go away"-action (described below).

The user's avatar is also comprised of a text input 403 and text output 404 area that allow the user to converse with the other users in the interaction space 301. Users can type their messages in the input area 403 and send their messages to the others by, for example, hitting the return key on their keyboards. The message is then shown in the output area 404 of the user's avatar, separated out from the previously entered messages by a demarcation symbol 405. The message is also forwarded by the client system 102 (via the server system 101) to the other users currently in the conversation. The different manners of conversing are discussed later in this description. The output area 404 contains a scrollbar 406 that allows the user to survey all of his previously entered messages.

The input and output areas can be minimized by clicking on the minimize-text-area arrow 407. FIG. 4 depicts the user's avatar when the text areas are minimized in 408. Note that the minimize-text-area arrow in 407 is turned into a maximize-text-area arrow in 408—where upon clicking, the text areas are returned to their normal state.

FIG. 5 illustrates how other users' avatars might appear to the user. The avatars of other users may look similar to the user's own avatar (as depicted in FIGS. 4 and 5). The differences between the two are as follows: avatars of the other users can be minimized 501 and closed 502; they only have text output areas 503; and they allow for different types of actions 504 (e.g. allows the current user to "wink" at the other user—discussed later).

Users can invite other online users into their interaction space 301. When this occurs, both users will appear in the other's interaction space 301. Their locations on their peer's interaction space 301 will reflect their avatar's coordinate (i.e. x-y) location in their space. Further, the server system 101 will update the interaction network 601: a real-time representation of the interaction spaces 301 that the users are currently part of as illustrated in FIG. 6. Each of the nodes 602 of the interaction network represents a user. The edges 603 of the network indicate that the users are part of each other's interaction space 301. The links in the interaction network are bidirectional, meaning for example, that the edge connecting user A and user C 603 indicates that A is part of C's interaction space and vice versa. Therefore, in the example network illustrated in FIG. 6, user A can see user B, D, and C (and vice versa—i.e. B, D, and C can see A); user E can see user B, and A (and vice versa); and user F 604 only see's himself One skilled in the art would recognize this as a simple bidirectional graph and would know of the many ways of implementing it.

Interaction spaces 301 are specific to the individual user. In other words, they are not transitive relationships. For example, if user A invites user B and user C—it is not necessarily the case that B and C will see each other because they do not share an interaction space 301. In order for them to see each other either B or C must invite the other into his interaction space 301. Therefore, users will only see those whom they have invited or were invited by. As mentioned above, this is an application of relaxed WYSIWIS design principles, and allows the user to tailor his interaction space 301 as he desires. To summarize, the edges 603 represented in FIG. 6 are reflexive (users can see themselves), symmetric (user A sees user C and vice versa), but not transitive relations. In other embodiments, however, including the transitive relation may be desirable—e.g. creating an equivalency class relationship (i.e. reflexive, symmetric, and transitive) for interaction spaces allows for more "traditional"/strict WYSIWIS virtual environments.

The invitation pane 701 illustrated in FIG. 7 allows users to invite other online users into their interaction space 301. The invitation pane 701 is constructed by the client system 102 after it receives information from the server system 101 regarding the users who are currently online. This information would include each online user's name and unique identifier. The online users are listed as shown in 701 where each row contains the user's name and an invite button 702. By clicking on user A's invite button 702, for example, the user initiates an invitation of user A into his interaction space 301. The list also refreshes periodically to exclude users who have logged off or include new users who have logged on.

FIG. 8 shows in time-course detail what occurs when a user invites another user into his interaction space 301. For clarity sake, it is useful to explicate some of the consistent conventions used in this figure and all subsequent figures. Each figure is separated out into equal parts—usually two. Each part represents a complete time-slice of the client and server systems, and is therefore marked as such—where time step 1 precedes time step 2, etc, with the understanding that these time steps immediately follow each other. Whenever necessary, a representation of the current state of the interaction network 601 (described above) as stored on the server system is displayed in the upper right hand corner of each part (e.g. see 801). Below these representations might be an area where a "zoom-in" on one of the components can be shown (e.g. see 802). The rest of the area is dedicated to showing the current state of the entire system (i.e. the perspectives of each of the client systems 102 and the server system 101). The lines linking the client systems 102 to the server system 101 represent communications connections between client and server. Of these, the solid lines represent bidirectional communications channels (e.g. persistent HTTP connections see 803), while dashed lines represent non-persistent channels (e.g. AJAX connections see 804). When necessary, arrows indicate the direction of the communication along these connections. Although it is not explicitly shown in these diagrams, both classes of connections are handled by the network library as discussed in previous sections of this description, and should be understood as such. When appropriate, the letters 'C' or 'W' will be shown in the "library box"

(e.g. 805) to explicated which of the two libraries, the controller library or the web content library—respectively, are involved in the event process.

As illustrated in 801, in the first time step we see that the current state of the interaction network is such that A and B are not part of each other's interaction space 301. This is reflected in both A's client browser 806 and in B's client browser 807. In this example, user B will invite user A by clicking on user A's invite button 808 displayed in the invitation pane 802. User B's controller library 805 will process this action by performing the following operations: First, it will fetch A and B's unique user ids (stored locally in the client system). Second, it will open a non-persistent channel 804 with the server system 816 and encode the invitation request as well as the user ids—marking B as the initiator.

Having received the invitation request, the server 816 then modifies the interaction network 801 to place a link between A and B 809. Next the server 816 looks up the coordinates of A and B's avatars. In time step 2, the server then sends the command 810 to B's controller library 811 (via the bidirectional connection) to create A's avatar at A's coordinate location 812. Similarly, the server sends the command 813 to A's controller library 814 to create B's avatar at its appropriate location 815. After the users become part of the other's interaction space, their associated "invitation buttons" 702, 808 become disabled—as users in this embodiment cannot invite those who are already present. The buttons become re-enabled when the users leave each other's space.

FIG. 9 illustrates how interactions are terminated, i.e. how users are "dis-invited" from interaction spaces. The current interaction network 901 shows that A and B can see each other in their interaction spaces (as reflected in their browser windows 902 and 903 respectively). In this example, user B will close user A's avatar—thus removing A from his interaction space. User B clicks on the close button on A's avatar, as shown in 904. This action is processed by B's controller library 905 in the following manner. First, A and B's unique identifier is retrieved. Second, a request to terminate, along with A and B's unique ids, are encoded and communicated to the server through a non-persistent communications channel 906. The server system 907, having received the request to terminate, fetches the interaction network and destroys the edge between A and B 908. Next, in time step 2, the server sends a message 909 to B's controller library 905 (via the bidirectional connection) to destroy A's avatar 910. A similar message 911 is sent to A's controller library 912 leading to the termination of B's avatar 913.

There are times when the interaction space might become cluttered with avatars and the user is unable to see the underlying contents of the page. In these situations, the user can "step away" from their interaction space as shown in FIG. 10. This action will hide all of the other objects in the interaction space except for the user's avatar—e.g. other users' avatars.

In the example shown in FIG. 10 user A will step away from his interaction space by clicking on the "away" button in his action menu 1001. User A's controller library 1002 will then hide all of the other avatars in the interaction space. The controller library 1002 will also send a message to the server informing it that user A has gone away 1003. Next, the server system—in time step 2, informs the controller libraries 1004, 1005 of the other client systems in A's interaction space (i.e. B and C) that user A has gone away. On B and C's system, A's avatar is displayed with the words "away" overlaid on top of A's image 1006. The "away" button in A's action menu 1001 is transformed into a "return/back" button 1007. When clicked, the "back" button returns the user back to the interaction space and 1) reveals all of the other avatars in his interaction space, and 2) returns A's avatar in B and C's space back to normal—i.e. without "away" overlaid on top of A's picture. When the user is away, all actions such as movements and such still occur—it is just that the user will not see them because he is removed from his interaction space.

Another way users can control their interaction space is to become "unavailable" for new interaction requests. The "unavailable" button—just like the "away" button", is displayed in the user's action menu 402. It is useful when the user does not want to be invited into new interaction spaces. When he clicks on the "unavailable" button, his associated "invitation button" is disabled on other users' screens, and the "unavailable" button is transformed into an "available" button. The user is still able to continue to invite other users into his interaction space, but in order to allow others to invite him the user must click the "available" button.

Users can move their avatars around their interaction space as illustrated in FIG. 11. In this example, user A moves towards user B by clicking-and-dragging his avatar to the location shown in 1101. When user A releases the mouse click, the controller library 1102 sends a message to the server 1103 informing the server of user A's user id and his new location through a non-persistent connection 1104. To cut-down on network traffic, certain heuristic may be implemented by the controller library such as only reporting moves that are greater than some minimal reporting distance.

The server system 1103, having received the message and its contents, updates the user's stored location with the new coordinate values. The server then checks to see if there are other users in A's interaction space. If there are none, then the action is complete. If, as illustrated by 1105, there are other users, e.g. user B, in the interaction space, then the server informs the other users of A's new location. In other words, the server sends a command 1106 to user B's controller library 1107 telling it to move A's avatar to the new location. B's controller library executes the command as illustrated in 1108. In this first embodiment, the avatars perform an animated movement to the new location rather than a "teleportation"—this has been found to be less disruptive to users.

If user A moves to a region in user B's interaction space that is already occupied by a user C, then rather than having one avatar overlap the other, user B's controller library may merge user A and user C's avatars into a single representation. For example, one simple way is to abut user A to user C's avatar.

The movement action may be held to other physical constraints. For example, if user A's path to its new location is blocked by a user C's avatar, user B's controller library may simulate certain physical interactions such as allowing A to bump into C, or routing A's path to steer clear of C. Other physical properties, like velocity, mass, and momentum, may also be simulated in the movement actions rendered by the controller libraries.

Users can converse with other users in their interaction space in one of three modes: broadcast, talk, and hybrid as illustrated in FIGS. 12-14. FIG. 12 illustrates how a user, A in this case, converses with other users, B and C, in broadcast mode. In broadcast mode, all of the users in A's interaction network 1201, can see A's messages. When user A types a message as shown in 1202, the controller library 1203 packages the message along with A's unique id and sends 1204 it to the server system 1205. The server system 1205, knowing that A is set on broadcast mode, fetches the interaction network 1201 to determine A's peers. The server then broadcasts the message to A's peers through their respective bidirectional connections 1206B and 1206C. The message is received by the respective controller libraries 1207, 1208 of each of the peers and displayed in A's output area 1209.

In talk mode, only those in proximity to the user will be able to see what the user types. This is meant to simulate real-world conditions where only those within a short distance of the speaker can clearly make out what he is saying. The minimal distance may be a fixed certain radius around the user. Certain "cocktail party effects" may be simulated by allowing this radius to be dependent on how crowded the interaction space is. There may be other factors that determine the radius, such as non-physical variables like 'social capital' or points earned, etc.

FIG. 13 illustrates how a user, A in this example, converses with other users in his interaction space 1301 (i.e. users B and C) in talk mode. The circle surrounding A 1302 represents the area that users must be within in order to see A's chatter. This circle may be shown when a user who is in talk mode clicks to move his avatar. It may also be permanently displayed to give the user a sense of his proximity.

As shown in time step 1, neither of the users in A's interaction space are within A's proximity. Therefore, the message that A has typed in 1303 is not seen by the other users. In talk mode, the user's controller library 1304 is responsible for determining who is within A's proximity i.e. who should the message be forwarded to. This can easily be done by calculating distances within the coordinate space between A and his peers e.g. $(x_1-x_2)^2+(y_1-y_2)^2=d^2$ where $(x_1,y_1)$ represent A's coordinates and $(x_2,y_2)$ represent the coordinates of one of his peers, and d is the distance between them. The message, the user's unique id, as well as the list of users who should receive the message (i.e. who are within a predetermined distance) are sent to the server system as shown in 1305. When no users are within the proximity the forwarding list is empty.

In time step 2, A has moved his avatar such that B is now within A's proximity 1306. Graphical cues may be displayed to indicate that B is in range: First, the borders of B's image turn green as shown in 1306a. Second, B's image is overlaid with an ephemeral icon shown in 1306b, which disappears after a few moments. These two visual cues are to indicate to the user that someone is within "hearing range" of the chatter, and they can occur when any of the users move within the interaction space. There are two similar cues that indicate that a user is outside of hearing range: first, the borders of the avatar's image turns red 1306c. Second, the icon shown in 1306c is overlaid briefly on top of the user's image. There are, of course, many other ways to inform the user whether someone is within hearing range or not, and this embodiment is not limited to these two cues just discussed.

When user A now types a message 1307, as shown in time step 2 of FIG. 13, A's controller library 1304 communicates several things to the server 1308: 1. the message, 2. A's unique id, and 3. a list of users who the message should be forwarded to. The server system routes the message 1309 to B's controller library 1310 through the associated bidirectional connection 1310, and the message is displayed in A's output area in B's browser 1311. Note that because C is not within hearing range, C does not see A's chatter.

Regardless of which mode the user is in, the user can override the system in two ways. First, users can "click-to-allow" other users to see their chatter regardless of how far they are on the screen. Second, users can "click-to-deny" other users which will deprive them of seeing what is typed. These override measures are referred to as "hybrid" mode and is partially illustrated in FIG. 14 where user A is in talk mode and C is not within A's proximity. As shown in 1401, A "clicks-to-allow" user C to hear his chatter, which invokes the display of the same visual cues as when a user comes in "hearing range" (i.e. 1301a,1301b): C's image border turns green 1401a and an icon is briefly overlaid 1401b. When user A now types the message 1402 shown in time step 2 of FIG. 14, A's controller library 1403 sends the message to the server system 1404 which then forwards the message to B and C's controllers libraries 1407, 1408 through their bidirectional connections 1405, 1406.

Users can convey emotional expressions to other users in the interaction space by performing a set of social actions such as (but not limited to) winking, smiling, frowning, etc. These social actions fall into one of two categories: directed and undirected. Directed social actions are events that only a subset of users in the interaction space can see. Undirected social actions are events that are seen by all users of an interaction space. Therefore, the user has two ways of emotional expression: a private means via directed social actions and a public means via undirected social actions.

An example of a directed action is shown in FIG. 15, where user A is directing a wink at user B. User A first clicks on the "wink at" button 1501 in B's action menu. A's controller library 1502 sends the request to the server by encoding the type of social action being performed via the bidirectional connection 1503. The controller library 1502 also encodes user A and B's unique ids and indicates A as the "actor". User A's controller library 1502 then overlays A's image with an iconic representation of the winking-action as shown in 1504. The server system, having received the request from A's client system, then commands B's controller library 1505 to do the same using an associated push function. B's client system executes the push function and overlays A's image with an iconic representation of the winking action 1504. This action is ephemeral: after a few moments, the iconic representation disappears. Importantly, in this directed social action, the display is only seen by the actor and the users who are acted upon, i.e. only A and B. As stated previously, winking is only one of many emotional expressions that can be performed in the interaction space.

An example of an undirected social action is shown in FIG. 16 where user A is looking to get the attention of the other users. In time step 1, user A clicks on the "get attention" button 1601 in his action menu. A's controller library 1602 then encodes the request (as well as A's unique id) and sends it to the server system via the bidirectional connection 1603. A's controller library executes the "get-attention" action as shown in 1604: it is a looming action where the user's avatar looms large for a few moments. The server, having received the request, uses the unique identifier to lookup A's peers (i.e. B and C) in the interaction network 1605. The server then sends commands (via associated push functions) 1606b and 1606c to B and C's controller libraries 1607, 1608 to perform the "get-attention" action with A's avatar as shown in 1604. The "get-attention" action is just an illustrative example of an action that expresses emotional content to all of the users in the interactions space. Other undirected social actions may include, for example, an expression of the user's excitement or happiness level.

Social actions (directed or undirected) may be distance dependent. This means that users might have to be inside or outside a predetermined proximity of other users in order to perform the action. For example, just as in talk-mode, it may be required that users are within a certain distance in order for them to "wink at" other users. In this case, user B's action menu might change to allow the "wink at" action after B moves within a certain distance of the user.

Users whose web content layers are displaying the same web page, as illustrated in FIG. 17, will A. be aware of other users currently editing and/or annotating the contents of the web page, and B. can simultaneously edit and/or annotate other regions of the web page. To edit/annotate the contents of a page, users must first request to "lock" a region of the content. As shown in time step 1, user A requests a lock by clicking-and-dragging the region defined in 1701. Users will only be allowed to edit/annotate the content contained within the region. The user's web content controller 1702 sends the request along with user A's id, and the coordinate information of the locked region to the server. The server 1703 must check to ensure locked-regions do not conflict—this is to guarantee data consistency in the page's content. If there is a conflict, user A will be informed with an appropriate error message. If there is no such conflict, then a lock on the region is reserved for user A. Those skilled in the art will be familiar with the various methods of preventing deadlocks. For example, a simple time-out mechanism can be employed where locks only live for a certain amount of time.

Other users viewing the same web page may be informed when a region has become locked. If the lock belongs to a user who is in the user's interaction space, then a link connecting the locked region to the avatar may be displayed. If, however, the lock belongs to a user who is not in the user's interaction space, as shown in 1704, then the user's name may be simply shown attached to the region. Users may only lock regions that are not already locked.

Once the lock is obtained, the user may edit and annotate the content as shown in time step 2 1705. This editing window allows the user to save or cancel his changes. If the user wishes to cancel, then the server is informed, the lock is released and content is left unchanged. If, however, the user wishes to save his changes, then the web content controller 1702 sends the new content to the server 1706; the server updates its version to reflect the new content 1707; releases the user's lock; and informs the other users on the web page of the revisions by sending the information to their web content controllers 1708.

The editing window also allows users to annotate the locked region. Users, both in addition to or in lieu of editing, can click on the button shown in 1709, and write a comment that will be associated with that region. Clicking the "ok" button with save the annotation and any revisions in the manner just described; likewise the "cancel" button will discard any of the user's annotations.

To view the comments of a web page, users can click on the "view comments" button in their action menu. When this occurs, a layer between the web content layer and the interaction space is shown—this is known as the comment layer. In the comment layer, all of the user generated comments are shown: for any given comment, the content region that it pertains to is highlighted with a unique color. Rectangular boxes that contain the comment would be shown in proximity to these highlighted regions. The rectangular boxes also include the user's name and/or avatar image. To dismiss the comment layer, users can click on the "hide comments" button in their action menu.

In FIG. 17, the web content is shown to be textual in nature. The web content may also include multimedia content, such as, but not limited to, graphical or aural content. To support the editing of these different types of content, those skilled in the art will appreciate that one need only to implement an appropriate editor, e.g. a text editor for textual content, a graphics editor for graphical content.

Alternative Embodiments

In the first embodiment, users can converse with each other through text messages entered on a keyboard. Alternative embodiments may allow users to engage in conversations through the use of a microphone device. This mode of conversation could be made in addition to, or in lieu of text-based conversations. Additionally, in the first embodiment, user avatars are graphically represented with static pictures. In other embodiments, however, avatars may graphically represent users through video, e.g. video clips, video streams (via web cam), and other forms of animated or video media.

In other embodiments of the invention, the avatars might look different or be comprised of different components from this first embodiment. For example, in an embodiment where users can talk to each other through the use of a microphone device, the text areas may be removed to reduce the footprint of the avatar. Similarly, in an embodiment where user initiated actions are de-emphasized, the action menu can be reduced or eliminated altogether. In yet other embodiments, users may be allowed to rearrange these components to suit their individual needs.

In the first embodiment, the user's interaction space is populated only with avatars. In alternative embodiments, however, other non-avatar objects (i.e. artifacts) can be present in the interaction spaces, thereby allowing for even greater dimensions of user interactions. For example, users can toss around a virtual ball, play virtual instruments, or even create new artifacts. In the first embodiment, objects in the interaction space have very few physical properties (i.e. location and spatial extent). In other embodiments, however, many more physical properties such as mass, velocity, etc. can be given to the objects in the interaction space—i.e. the ball will not only have location and spatial extent, but also mass and velocity. In addition to these physical properties, a set of physical laws can be specified by the controller library in order to simulate a physical system in the interaction space.

In the first embodiment, content annotations are openly viewable by the public. In other embodiments, however, methods to allow the user to set permissions on who, e.g. "friends only", can view the comment might make for a compelling feature. For example, users can find "Easter eggs" that their friends have left them while browsing through the website.

In the first embodiment, users may alter the content of pages in the web content layer. In alternative embodiments, a content management system may be used to track the content's change throughout time. The server system, therefore, has a record of the evolution of the content and its associated annotations. In addition to being able to track which users have contributed to the current version, the server system will also know what each user's contribution was—and who, if any, is most responsible for the current version, etc. And, for example, in the event of content defacement, the content management system will allow for "roll-backs" to previous (un-defaced) versions. The client system of this alternative embodiment may "stack" the different versions of the web content on top of each other (just as the interaction space is "stacked" over the web content layer), thereby allowing the user to see the evolution of the content through time.

In the first embodiment, the user interface was only composed of one interaction space overlaid on top of one web content layer. The stacking mechanism, just described above, may also be used in other embodiments to allow users to participate in multiple interaction spaces and/or multiple web content layers simultaneously. These alternative embodiments may have some means for the user to select an "active" interaction space/web content region among the plurality.

An alternative embodiment that is quite compelling uses Global Positioning System (GPS) technology to enhance the capabilities of the present invention. Suppose, for example, that our users are attending a professional conference at a convention hall. Further suppose that our users can access the website supported by the present invention using their GPS enabled mobile device. A conference organizer, before the start of the event, signs onto the server system and defines the physical area of the convention hall using GPS coordinates. In this situation, GPS allows the system to make the interaction space reflective of the actual convention hall. In other words, the x-y coordinates of the user's avatar in his interaction space corresponds to the real-time GPS coordinates of the user in the convention hall. Thus, the interaction space is a metaphor or a scaled (2D top-down) version of the convention hall. And as the user moves about the convention hall, so does his avatar move in the interaction space.

Advantages

From the description above, a number of advantages of some embodiments of this present invention become evident:
- (a) A virtual environment for multi-user interaction and collaboration is created for web application systems; this environment balances the needs of the group and those of the individual by implementing relaxed WYSIWIS design principles
- (b) The virtual environment is a contained space: e.g. there isn't a space for avatars, and a separate space for chatting. Everything happens within a single region (composed of two layers)
- (c) The interaction space, having a two dimensional coordinate system, is better suited for web page content
- (d) The separation of interaction space and web content layer allows for users to simultaneously participate in multi-user activities among different groups
- (e) The user owns the interaction space, and therefore can control which users are allowed access, whom to interact with, etc.
- (f) All users of an interaction space are immediate and apparent to the other users of that space
- (g) The interaction space becomes a reflection of real-world environments, simulating, for example, how normal conversations would occur (e.g. talk mode), and how normal social interactions take place (e.g. through expressions like "winking")
- (h) The web content layer can become a space for simultaneous group collaboration efforts
- (i) Web experiences no longer have to be solitary: users reading the same news article may engage in spontaneous discussions; users can view online videos together as if in a movie theatre; users can draw on a collaborative "white-board" together

CONCLUSIONS, RAMIFICATIONS, AND SCOPE

Although the description above contains many specificities, these should not be construed as limiting the scope of the embodiment. Rather they provide illustrations of some of the presently preferred embodiments. For example, the script programs may be written in several languages, including JAVASCRIPT, JAVA Applet, and ADOBE FLASH; avatar representations may take on other forms; etc.

Thus the scope of the embodiment should be determined by the appended claims and their legal equivalents rather than the examples given.

I claim:

1. A multi-user system, associated with a first user and a plurality of non-first users each having respective client systems associated therewith and wherein each client system is connected to a server system through a computer network, the system providing multi-user interactive environments on web pages served by the server system, the multi-user system comprising:
   a user interface, the user interface being executed by a client system of the first user, the user interface being defined by a set of programs that are provided by the server system, and the set of programs providing bidirectional communications between the server system and the client system of the first user;
   the user interface comprising a rendered web content layer, the rendered web content layer being an area for displaying rendered web content served by the server system;
   the user interface further comprising an interaction space for multi-user actions, the interaction space being overlaid on top of the rendered web content layer;
   the user interface providing a coordinate system for the interaction space, the coordinate system enabling geometric measurements;
   the user interface embodying the first user in the interaction space as a first user graphical representation, the first user graphical representation being positioned within the interaction space according to first user coordinates; and
   the user interface being a real-time multi-user environment comprising:
      a control means allowing the first user to control presence of non-first users in the interaction space of the first user;
      an embodying means that embodies non-first users who are allowed membership into the interaction space of the first user as non-first user graphical representations, wherein each non-first user graphical representation is positioned within the interaction space of the first user according to their respective non-first user coordinates;
      a movement control means for first user movement control of the first user graphical representation in the interaction space, such that the movement action is replicated in the interaction spaces of all non-first users who are in the interaction space of the first user;
      a conversating means for conversating among first user and non-first users in the interaction space of the first user; and
      an editing means for at least one of multi-user simultaneous annotating and editing of the rendered web content layer, wherein the rendered web content layer of the first user and the rendered web content layer of at least one of the plurality of non-first users are displaying the same web page, and wherein one of the first user or one of the plurality of non-first users requests a region of content rendered on the displayed web page to be locked for editing before such one of the first user or one of the plurality of non-first users is allowed to edit or annotate the region of content.

2. The system of claim 1, wherein the coordinate system for the interaction space is two dimensional.

3. The system of claim 1, further comprising a decoupling means for decoupling the interaction space from the rendered web content layer, wherein:
   given the first user and a non-first user who are in each other's interaction space, view or contents of the first user's rendered web content layer is different from view or content of the non-first user's rendered web content layer, or
   given the first user and the non-first user where the rendered web content layers of both users contain the same web content, the first user and the non-first user are not in each other's interaction space.

4. The system of claim 1, further comprising:
a directed social action means for controlling directed social actions in the interaction space.

5. The system of claim 1, further comprising:
an undirected social action means for controlling undirected social actions in the interaction space.

6. The system of claim 1, wherein conversating is conducted through text messages inputted through a keyboard.

7. The system of claim 1, wherein conversating is conducted through audio messages inputted through a microphone.

8. The system of claim 1, wherein the first user graphical representation and non-first user graphical representations are static image media.

9. The system of claim 1, wherein the first user graphical representation and non-first user graphical representations are video media.

10. The system of claim 1, further comprising
providing at least one of the first user graphical representation and the non-first user graphical representations with physical properties,
specifying a set of physical laws pertaining to said physical properties simulating a physical environment in the interaction space based on the physical laws.

11. The system of claim 1, further comprising
populating the interaction space with non-user objects,
providing the non-user objects with physical properties,
specifying a set of physical laws pertaining to said physical properties, and
simulating a physical environment in the interaction space using the physical laws.

12. The system of claim 1, wherein
the client systems are devices that are capable of determining Global Positioning System (GPS) coordinates of the first user in a real-world space, mapping the first user GPS coordinates to the coordinate system of the interaction space, and
positioning the first user graphical representation within the interaction space according to the mapped GPS coordinates,
wherein the positions of the users in the real-world space are reflected in the interaction space.

13. The system of claim 1, wherein at least one of the first user graphical representation and the non-first user graphical user representations is configurable by the first user.

14. The system of claim 1, further comprising:
a graph representing friendship relationship between the first user and the non-first users, wherein annotations of the rendered web content layer of the first user are only viewable by: the first user, the first user and the non-first users represented by the graph representing the friendship relationship between the first user and the non-first users, or the first user and the plurality of non-first users.

15. The system of claim 1, further comprising:
a content management system to track at least one of: changes made to the rendered web content layer, annotations associated with the rendered web content layer, and the first user or a non-first user responsible for a change in the rendered web content layer, whereby at least one of the changes to the rendered web content layer, the annotations associated with the rendered web content layer, and the first user or one of the plurality of non-first users responsible for the changes are displayed, and whereby the rendered web content layer is restorable to a previous state.

16. The system of claim 15, wherein the user at least one of changes to the rendered web content layer, the annotations associated with the rendered web content layer, and the first user or one of the plurality of non-first users responsible for the changes are displayed by the user interface overlaid on top of each other.

17. The system of claim 1, further comprising:
a snooping means, wherein given the first user and a non-first user who share the interaction space, the first user can at least share or see the non-first user's rendered web content layer.

18. The system of claim 1,
wherein the user interface supports a plurality of interaction spaces.

19. A method for multi-user interaction, associated with a first user and a plurality of non-first users each having respective client systems associated therewith and wherein each client system is connected to a server system through a computer network, the system providing multi-user interactive environments on web pages served by the server system, the method comprising:
a user interface execution step, wherein a user interface is executed by a client system of the first user, the user interface being defined by a set of programs that are provided by the server system, and the set of programs providing bidirectional communications between the server system and the client system of the first user;
the user interface comprising a rendered web content layer, the rendered web content layer being an area for displaying rendered web content served by the server system;
the user interface further comprising an interaction space for multi-user actions, the interaction space being overlaid on top of the rendered web content layer;
the user interface providing a coordinate system for the interaction space, the coordinate system enabling geometric measurements;
the user interface embodying the first user in the interaction space as a first user graphical representation, the first user graphical representation being positioned within the interaction space according to first user coordinates; and
the user interface being a real-time multi-user environment comprising:
an access controlling step allowing the first user to control presence of non-first users in the interaction space of the first user;
an embodying step that embodies non-first users who are allowed membership into the interaction space of the first user as non-first user graphical representations, wherein each non-first user graphical representation is positioned within the interaction space of the first user according to their respective non-first user coordinates;
a movement control step for first user movement control of the first user graphical representation in the interaction space, such that the movement action is replicated in the interaction spaces of all non-first users who are in the interaction space of the first user;
a conversating step for conversating among first user and non-first users in the interaction space of the first user; and
an editing step for at least one of multi-user simultaneous annotating and editing of the rendered web content layer, wherein the rendered web content layer of the first user and the rendered web content layer of at least one of the plurality of non-first users are displaying the same web page, and wherein one of the first user or one of the plurality of non-first users requests a region of content rendered on the displayed web page to be locked for editing before such one of the first user or one of the plurality of non-first users is allowed to edit or annotate the region of content.

20. A multi-user apparatus, associated with a first user and a plurality of non-first users each having respective client systems associated therewith and wherein each client system is connected to a server system through a computer network, the apparatus providing multi-user interactive environments on web pages served by the server system, the multi-user apparatus comprising:

- a user interface, the user interface being executed by a client system of the first user, the user interface being defined by a set of programs that are provided by the server system, and the set of programs providing bidirectional communications between the server system and the client system of the first user;
- the user interface comprising a rendered web content layer, the rendered web content layer being an area for displaying rendered web content served by the server system;
- the user interface further comprising an interaction space for multi-user actions, the interaction space being overlaid on top of the rendered web content layer;
- the user interface providing a coordinate system for the interaction space, the coordinate system enabling geometric measurements;
- the user interface embodying the first user in the interaction space as a first user graphical representation, the first user graphical representation being positioned within the interaction space according to first user coordinates; and
- the user interface being a real-time multi-user environment comprising:
  - a user control component allowing the first user to control presence of non-first users in the interaction space of the first user;
  - an embodying component that embodies non-first users who are allowed membership into the interaction space of the first user as non-first user graphical representations, wherein each non-first user graphical representation is positioned within the interaction space of the first user according to their respective non-first user coordinates;
  - a movement component for first user movement control of the first user graphical representation in the interaction space, such that the movement action is replicated in the interaction spaces of all non-first users who are in the interaction space of the first user;
  - a conversating component for conversating among first user and non-first users in the interaction space of the first user; and
  - an editing component for at least one of multi-user simultaneous annotating and editing of the rendered web content layer, wherein the rendered web content layer of the first user and the rendered web content layer of at least one of the plurality of non-first users are displaying the same web page, and wherein one of the first user or one of the plurality of non-first users requests a region of content rendered on the displayed web page to be locked for editing before such one of the first user or one of the plurality of non-first users is allowed to edit or annotate the region of content.

* * * * *